(12) United States Patent
Balabine et al.

(10) Patent No.: US 10,542,024 B2
(45) Date of Patent: Jan. 21, 2020

(54) METHOD AND SYSTEM FOR CONFIDENT ANOMALY DETECTION IN COMPUTER NETWORK TRAFFIC

(71) Applicant: NetFlow Logic Corporation, Atherton, CA (US)

(72) Inventors: Igor Balabine, Menlo Park, CA (US); Alexander Velednitsky, Menlo Park, CA (US)

(73) Assignee: NETFLOW LOGIC CORPORATION, Atherton, CA (US)

( * ) Notice: Subject to any disclaimer, the term of this patent is extended or adjusted under 35 U.S.C. 154(b) by 0 days.

(21) Appl. No.: 15/838,301

(22) Filed: Dec. 11, 2017

(65) Prior Publication Data
US 2018/0337836 A1    Nov. 22, 2018

Related U.S. Application Data

(63) Continuation of application No. 14/627,963, filed on Feb. 20, 2015, now Pat. No. 9,843,488, which is a continuation-in-part of application No. 13/669,235, filed on Nov. 5, 2012, now Pat. No. 9,392,010, and a continuation-in-part of application No. 13/830,924, filed on Mar. 14, 2013, now abandoned.

(60) Provisional application No. 61/987,440, filed on May 1, 2014, provisional application No. 61/556,817, filed on Nov. 7, 2011, provisional application No. 61/699,823, filed on Sep. 11, 2012, provisional application No. 61/751,243, filed on Jan. 10, 2013.

(51) Int. Cl.
*H04L 29/06*  (2006.01)
*H04L 12/26*  (2006.01)
*G06F 21/55*  (2013.01)

(52) U.S. Cl.
CPC ........ *H04L 63/1425* (2013.01); *G06F 21/554* (2013.01); *H04L 43/04* (2013.01); *H04L 63/0227* (2013.01); *H04L 63/1416* (2013.01); *H04L 63/1458* (2013.01)

(58) Field of Classification Search
CPC ............. H04L 63/0227; H04L 63/1416; H04L 63/1425; H04L 63/1458; H04L 43/04; G06F 21/554
See application file for complete search history.

(56) References Cited

U.S. PATENT DOCUMENTS 7,331,060 B1    2/2008 Ricciulli
7,584,507 B1 *  9/2009 Nucci ................. H04L 63/1416
                                                          726/22

(Continued)

OTHER PUBLICATIONS

Kensuke Fukuda, "On the use of weighted syslog time series for anomaly detection", 2011, IEEE (Year: 2011).*

(Continued)

*Primary Examiner* — Meng Li
*Assistant Examiner* — Alexander R Lapian
(74) *Attorney, Agent, or Firm* — Kang S. Lim

(57) ABSTRACT

The present invention relates to systems and methods for detecting anomalies in computer network traffic with fewer false positives and without the need for time-consuming and unreliable historical baselines. Upon detection, traffic anomalies can be processed to determine valuable network insights, including health of interfaces, devices and network services, as well as to provide timely alerts in the event of attack.

7 Claims, 24 Drawing Sheets

(56) References Cited

U.S. PATENT DOCUMENTS

| | | |
|---|---|---|
| 7,633,944 B1 | 12/2009 | Chang et al. |
| 7,653,633 B2 | 1/2010 | Villella et al. |
| 7,724,728 B2 | 5/2010 | Pullela et al. |
| 7,996,427 B1 | 8/2011 | Flick et al. |
| 8,011,010 B2 | 8/2011 | Michael et al. |
| 8,359,320 B2 | 1/2013 | Howcroft et al. |
| 8,483,056 B2 | 7/2013 | Chen et al. |
| 8,484,737 B2 | 7/2013 | Swift et al. |
| 8,503,302 B2 | 8/2013 | Golic et al. |
| 8,561,187 B1 | 10/2013 | Hegli |
| 8,578,493 B1 | 11/2013 | Cowan et al. |
| 8,611,219 B2 | 12/2013 | Golic |
| 8,627,477 B2 | 1/2014 | Chen et al. |
| 8,631,022 B2 | 1/2014 | Howcroft et al. |
| 8,635,319 B1 * | 1/2014 | Cuthbert ............. H04L 43/0811 709/223 |
| 8,914,406 B1 | 12/2014 | Haugsnes et al. |
| 2002/0001395 A1 | 1/2002 | Davis et al. |
| 2002/0083175 A1 | 6/2002 | Afek et al. |
| 2004/0117658 A1 | 6/2004 | Klaes |
| 2005/0018618 A1 * | 1/2005 | Mualem .............. H04L 63/1458 370/252 |
| 2005/0193429 A1 * | 9/2005 | Demopoulos ......... G06F 21/552 726/23 |
| 2006/0059568 A1 * | 3/2006 | Smith-Mickelson ........................ H04L 43/00 726/27 |
| 2007/0033190 A1 | 2/2007 | Dodaro et al. |
| 2007/0115850 A1 | 5/2007 | Tsuchiya et al. |
| 2007/0234426 A1 | 10/2007 | Khanolkar et al. |
| 2008/0134339 A1 * | 6/2008 | Kim .................... H04L 63/1416 726/25 |
| 2008/0168453 A1 | 7/2008 | Hutson |
| 2008/0177755 A1 | 7/2008 | Stern et al. |
| 2009/0016236 A1 | 1/2009 | Alcala et al. |
| 2009/0019458 A1 | 1/2009 | Katari et al. |
| 2010/0011031 A1 | 1/2010 | Huang et al. |
| 2010/0071065 A1 | 3/2010 | Khan et al. |
| 2010/0074112 A1 | 3/2010 | Derr |
| 2010/0162399 A1 | 6/2010 | Sheleheda et al. |
| 2010/0180104 A1 | 7/2010 | Henry et al. |
| 2010/0290346 A1 * | 11/2010 | Barford ................ H04L 41/064 370/242 |
| 2011/0004876 A1 | 1/2011 | Wu et al. |
| 2011/0113109 A1 | 5/2011 | LeVasseur et al. |
| 2011/0258315 A1 | 10/2011 | Whitmore et al. |
| 2012/0011589 A1 | 1/2012 | Chen et al. |
| 2012/0017262 A1 | 1/2012 | Kapoor et al. |
| 2012/0096525 A1 | 4/2012 | Bolgert et al. |
| 2012/0117254 A1 * | 5/2012 | Ehrlich ................. H04L 41/142 709/228 |
| 2012/0221639 A1 * | 8/2012 | Mallet ................... G06Q 50/01 709/204 |
| 2012/0240236 A1 | 9/2012 | Wyatt et al. |
| 2012/0284791 A1 | 11/2012 | Miller et al. |
| 2013/0064096 A1 | 3/2013 | Degioanni et al. |
| 2013/0104230 A1 | 4/2013 | Tang et al. |
| 2013/0117847 A1 | 5/2013 | Friedman et al. |
| 2013/0298254 A1 | 11/2013 | Thomas Hall et al. |
| 2014/0059678 A1 | 2/2014 | Parker |
| 2014/0075557 A1 | 3/2014 | Balabine et al. |
| 2014/0101763 A1 * | 4/2014 | Harlacher ........... H04L 63/1425 726/23 |

OTHER PUBLICATIONS

USPTO, ISA/US, International Search Report and Written Opinion in PCT Application No. PCT/US2014/010932, dated Jun. 3, 2014, 9 pages.

Korean Intellectual Property Office, ISA/KR, "International Search Report and Written Opinion" in PCT Application No. PCT/US2012/063749, dated Feb. 25, 2013, 12 pages.

Open Network Foundation, "Software-Defined Networking: The New Norm for Networks",(online) published Apr. 13, 2012 (retrieved on May 20, 2014) URL:https://www.opennetworking.org/images/stories/downloads/sdn-resources/white-papers/wp-sdn-newnorm.pdf, 12 pages.

USPTO, ISA/US, International Search Report and Written Opinion in PCT Application No. PCT/US2015/028869, dated Jul. 29, 2015, 13 pages.

* cited by examiner

Fig. 4

Fuzzy Inference Matrix

METHOD AND SYSTEM FOR CONFIDENT ANOMALY DETECTION IN COMPUTER NETWORK TRAFFIC

CROSS REFERENCE TO RELATED APPLICATIONS

This application claims the benefit of and is a Continuation of application Ser. No. 14/627,963, filed Feb. 20, 2015, of the same title, which application claims the benefit of provisional application No. 61/987,440, May 1, 2014, of the same title, which applications are incorporated herein in their entirety by this reference.

Application Ser. No. 14/627,963 also claims the benefit of and is a Continuation-in-Part of non-provisional application Ser. No. 13/669,235, filed Nov. 5, 2012, entitled "A Streaming Method and System for Processing Network Metadata", now U.S. Pat. No. 9,392,010, which application is a non-provisional of both provisional application No. 61/556,817 filed on Nov. 7, 2011, same title, and No. 61/699,823, filed Sep. 11, 2012, same title, which applications are incorporated herein in their entirety by this reference.

Application Ser. No. 14/627,963 additionally claims the benefit of and is a Continuation-in-Part of non-provisional application Ser. No. 13/830,924, filed Mar. 14, 2013, entitled "An Improved Streaming Method and System for Processing Network Metadata", which application is a non-provisional of provisional application No. 61/751,243 filed on Jan. 10, 2013, same title, which applications are incorporated herein in their entirety by this reference.

BACKGROUND

A system and method for detecting and classifying network traffic anomalies is disclosed. The system includes an input module receiving a data stream containing information related to the network traffic, one or a plurality of the data stream analyzers and a correlation module. The correlation module receives results of the data stream analysis by the analyzers and determines if the potential anomaly is false or true.

REFERENCES

Jackson Higgins, K., What a DDoS Can Cost, Information Week Dark Reading, May 5, 2012

Lin, D., Network Intrusion Detection and Mitigation against Denial of Service Attack, University of Pennsylvania, 2013

Mamdani, E. H., Application of Fuzzy Logic to Approximate Reasoning Using Linguistic Synthesis, IEEE Transactions on Computers, vol. 26, no. 12, pp. 1182-1191, December 1977

Sugeno, Michio, Advances in Fuzzy Measures: Theory and Applications, First International Conference on Fuzzy Information processing, Hawaii, July 1984

Zadeh L. A., Kacprzyk, J., Computing with Words, Physica-Verlag, Heidelberg, 1999

Basseville, M., Nikiforov, I., Detection of Abrupt Changes: Theory and Application, Prentice Hall, 1993

Chui, Charles K., An Introduction to Wavelets, Academic Press, 1992

Cortes, C., Vapnik, V., Support-vector networks, Machine Learning, v.20, pp. 273-297, 1995

Markovsky, I., Van Huffel S., Overview of total least squares methods, Signal process, v.87, pp. 2283-2302, 2007

Shannon, Claude E., A Mathematical Theory of Communication, University of Illinois Press, 1949

Martin, Nathaniel F. G., England, James W., Mathematical Theory of Entropy, Cambridge University Press, 2011

FIELD OF THE INVENTION

In general the present invention relates to network monitoring and event management. More specifically, it relates to processing of network metadata obtained through network monitoring, which may efficiently result in useful information being reported in a timely manner to a consumer of the metadata.

Network monitoring is a critical information technology (IT) function often used by Enterprises and Service Providers, which involves watching the activities occurring on an internal network for problems related to performance, misbehaving hosts, suspicious user activity, etc. Network monitoring is made possible due to the information generated and provided by various network devices. The information has been generally referred to as network metadata, i.e., a class of information describing activity on the network which is supplemental and complementary to the primary information traffic transmitted over the network.

Syslog is one type of network metadata commonly used for network monitoring. Syslog has become a standard format for logging program messages and provides devices which would otherwise be unable to communicate a means to notify administrators of problems or performance. Syslog is often used for computer system management and security auditing as well as generalized informational, analysis, and debugging messages. It is supported by a wide variety of devices (like printers and routers) and receivers across multiple platforms. Because of this, syslog can be used to integrate log data from many different types of devices in a computer system into a central repository.

More recently, another type of network metadata, referred to by various vendors as NetFlow, jFlow, sFlow, etc., has also been introduced as a part of standard network traffic (hereafter generally referred to as "NetFlow".) NetFlow is a network protocol for collecting IP traffic information that has become an industry standard for traffic monitoring. NetFlow can be generated by a variety of network devices such as routers, switches, firewalls, intrusion detection systems (IDS), intrusion protection systems (IPS), network address translation (NAT) entities and many others. However, until recently, NetFlow network metadata was used exclusively for post factum network supervision purposes such as network topology discovery, locating network throughput bottlenecks, Service Level Agreement (SLA) validation, etc. Such limited use of NetFlow metadata can generally be attributed to the high volume and high delivery rate of information produced by the network devices, the diversity of the information sources and an overall complexity of integrating additional information streams into existing event analyzers. More particularly, NetFlow metadata producers have typically generated more information than consumers could analyze and use in a real time setting. For example, a single medium to large switch on a network might generate 400,000 NetFlow records per second.

Today's syslog collectors, syslog analyzers, security information management (SIM) systems, security event management (SEM) systems, security information and event management (SIEM) systems, etc. (collectively hereafter referred to as an "STEM system") are either incapable of receiving and analyzing NetFlow, are limited to processing rudimentary information contained in NetFlow packets, or process NetFlow packets at rates much lower than such packets are typically generated.

The advent of robust network monitoring protocols such as NetFlow v9 (RFC 3954) and IPFIX (RFC 5101 and related IETF RFC) drastically expands the opportunity to use network metadata in the realm of network security and intelligent network management. At the same time, due to the constraints identified above, today's SIEM systems are not generally capable of utilizing network monitoring information beyond simply reporting observed byte and packet counts.

Anomaly detection on a computer network is the identification of items, events or behavior which differ from an expected, desired or normal pattern. When studied in the context of the network traffic, anomaly detection can be broadly classified into two categories:

a) network traffic anomalies in a neutral operational environment and b) network traffic anomalies in the presence of malicious actors.

Type (a) network traffic anomalies occur under normal operational conditions due to naturally overloaded or defective network devices or "flash mobs"—benign events when network traffic sufficiently increases due to an influx of legitimate network users.

Type (b) events may be caused by external forces and can be malicious in nature. There is a number of ways that an attacker may cause malicious network anomalies but the Denial of Service (DoS) attack and its variant Distributed Denial of Service (DDoS) attack are by far the most common and easiest to stage. With the DoS attack, the attacker's purpose is to make one or more network resources inaccessible to legitimate users and thus to disrupt the activities of an organization. According to a 2012 survey of 1,000 IT professionals, each hour in which their organization is subject to a DDoS attack costs a victim organization between $10,000 and $50,000 in lost revenue.

In order to avoid significant loss of business and revenue, network traffic anomalies of both types should be detected, classified and made known in a timely manner to the network operators. The problem of network outages becomes even more severe in industrial and military networks, when a loss of communications may cause catastrophic consequences.

However, network anomaly detection becomes exceptionally hard when the number of items under observation increases along with the complexity of each observed item. Detecting anomalies in network traffic is one of the extreme examples of a complex anomaly detection problem.

A traditional approach to network anomaly detection requires creating a historic baseline pattern which is compared to the current pattern when assessing deviation from a normal behavior. This traditional approach is inherently problematic in lieu of the following considerations:

Network traffic is dynamic and there is rarely a single pattern which describes its temporal characteristics. This may lead to the complex task of creating a great number of time bounded historic baselines, which become almost immediately outdated after a slight change in the operational environment.

The network itself is dynamic because, invariably, new devices are installed, old devices are removed and operating devices may be taken down for maintenance. Upon each change, an earlier established baseline loses its validity and has to be reestablished to adjust to each new network configuration.

Trends such as software virtualization, Software Defined Networks (SDNs) and Network Function Virtualization (NFV) further increase the dynamic nature of the network by creating transient virtual networks capable of migrating across the physical network. Even in the absence of any physical network changes, instantiation of new network traffic producers and consumers immediately invalidates established traffic baselines.

A high rate of change in the network ecosystem makes comparison of the current network characteristics with historic data error prone and highly susceptible to false positives.

Two approaches are known to have been previously utilized to attempt to detect DoS and DDoS attacks; a (a) a signature based approach, and (b) a baseline traffic based approaches. A recent University of Pennsylvania study reported that certain of today's DDoS detection systems (Snort, PHAD, MADAME and MULTOPS) operate at low efficiency levels. In particular, the study articulated a low detection rate of unknown DDoS attacks by signature based systems (Snort, MADAME), a high false alarm rate of the systems relying on the baseline traffic information (PHAD) or any upfront assumptions concerning the traffic profiles (MULTOPS) and a requirement to completely re-train the systems relying on the baseline traffic information (PHAD) when the traffic changes.

SUMMARY OF THE INVENTION

The present invention solves many of the problems associated with the traditional baseline anomaly detection approach by eliminating reliance on historically established baselines or upfront assumptions. Instead, embodiments of the invention are able to identify anomalies by detecting momentary changes and evaluating the trends in the observed traffic characteristics.

Embodiments of the present invention introduce a novel approach by computing trends in the observed network traffic characteristics and, in case of a multi-dimensional universe of discourse, computing higher-level trends in the observed network traffic characteristics and classifying the computed higher-level trends into linguistic categories easily understood by humans.

Embodiments of the present invention reduce the number of false positives experienced in network anomaly detection by assessing a plurality of the network traffic characteristics at once, applying a plurality of mathematical anomaly detection methods to the plurality of network traffic characteristics and applying a fuzzy logic-based model of the network node health to the results produced by the plurality of mathematical anomaly detection methods.

Embodiments of this invention are able to track abnormal traffic patterns in important network junctures such as networking devices' interfaces, assess current health of the network devices and the networking infrastructure as a whole and determine the trend of the network elements health thus predicting possible network failures. Based on the network health trend analysis, the operator is capable of optimizing the network resources and avoiding outages. Alternatively, network optimization or maintenance decisions may be made automatically.

Embodiments of this invention are further able to identify important network security problems, such as detection of Denial of Service (DoS) and Distributed Denial of Service (DDoS) attacks in real time. Timely attack detection permits automatic or manual alerting of a mitigation system to such attack when the confidence level of attack detection is sufficient, as determined or pre-determined by the operator.

Embodiments of this invention may operate in the streaming fashion without resorting to a post factum analysis and provide information about critical network elements condition in real time. In such embodiments, said stream of information packets may be permanently stored only after applying at least one analytical algorithm to compute a metric for assessing operational condition of the network for determining if a network anomaly exists. It should be appreciated that the method disclosed in this invention is applicable to the network data at rest as well.

Embodiments of this invention may also be quickly deployed into service because they do not impose upon the operator a slow and costly baseline traffic information acquisition pre-process.

BRIEF DESCRIPTION OF THE DRAWINGS

In order that the present invention may be more clearly ascertained, some embodiments will now be described, by way of example, with reference to the accompanying drawings, in which:

FIG. 4 illustrates an exemplary fuzzy inference matrix mapping observed traffic parameters linguistic values to the Attention Level universe of discourse;

DETAILED DESCRIPTION OF THE INVENTION

Figure 1:
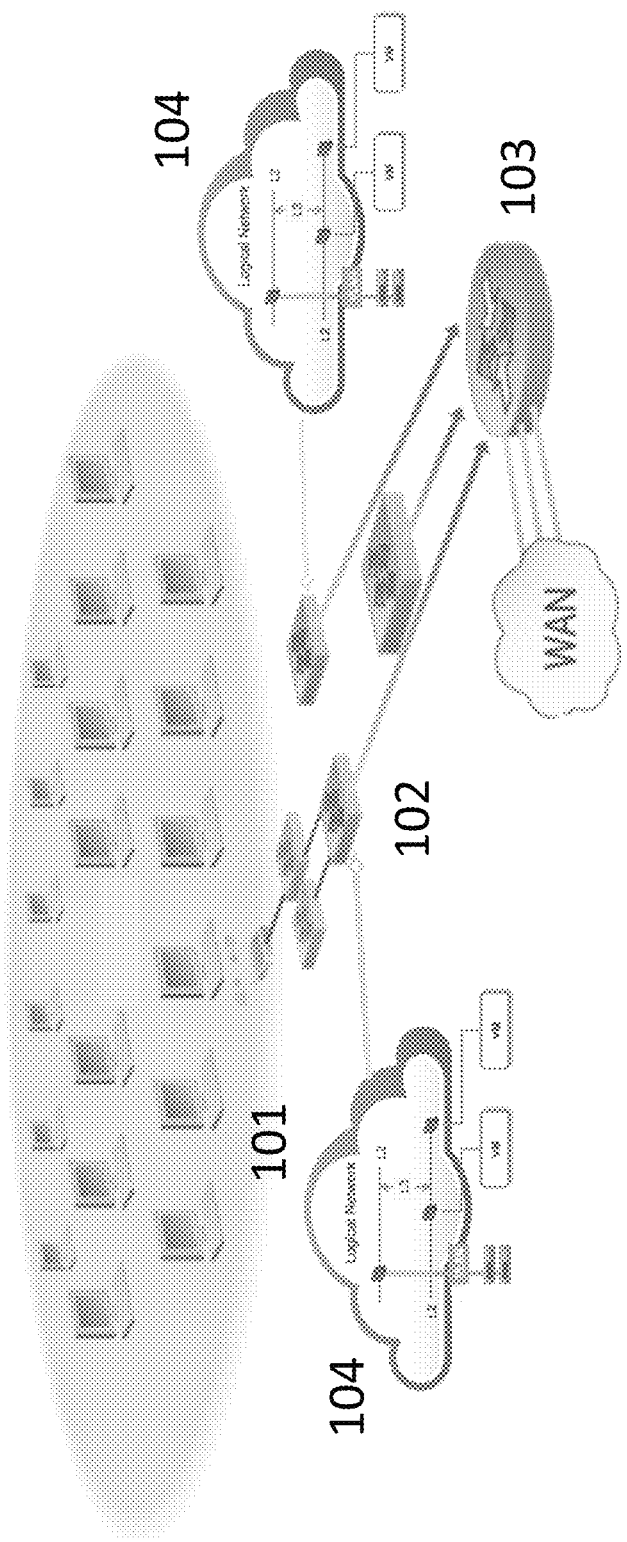
FIG. 1 illustrates an exemplary simple computer network in which network devices such as, but not limited to, routers 103 and switches 102 provide connectivity between end points such as physical host computers, 101, or virtual machines 104 executing on the physical host computers 101.

In general, the present invention relates to network monitoring and event management. More specifically it relates to processing network metadata obtained as a result of network monitoring activities and subsequent processing of the metadata, which may result in useful information being reported to an operator and/or event management system in a timely manner.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

In the following description, the invention is disclosed in the context of network metadata processing for the purposes of illustration only. However, it will be appreciated that the invention is suitable for a broader variety of applications and uses and certain embodiments of the invention are applicable in contexts other than network metadata processing. For example, methods disclosed herein may be applied to controlling city traffic flow by regulating duration of the traffic lights at the intersections. In yet another example, methods disclosed herein may be suitable for controlling a power grid. It is also appreciated that the methods disclosed herein are applicable without limitations related to the actual network traffic itself.

In one embodiment of this invention, the method and system may be implemented using one or more instances of NetFlow Integrator ("NFI")—a software program which enables the integration of NetFlow traffic in versions 1 through 8, NetFlow v9, jFlow, sflowd, sFlow, NetStream, IPFIX and similar ("NetFlow") traffic with any system capable of storing and/or processing network metadata in syslog format. The integration may be achieved by converting network metadata generated by the NetFlow producers on the network into a lingua franca of network monitoring systems—syslog. Mapping of the NetFlow information to corresponding syslog information may be performed according to policies, rules and priorities established by the NFI Administrator.

It should be appreciated that the use of syslog for reporting network metadata is exemplary and other data presentation and delivery methods such as, without limitation, CEF or JSON, may be used.

Network Health Assessment

FIG. 1 illustrates an exemplary simple computer network in which network devices such as, but not limited to, routers 103 and switches 102 provide connectivity between end points such as physical host computers, 101, or virtual machines 104 executing on the physical host computers 101.

A typical computer network is a complex system in which reliability declines as the number of the networked devices and volume of network traffic increases. And as the network size increases, the task of understanding the network state and assessing the condition of individual network nodes becomes both more difficult and more important.

Figure 2:
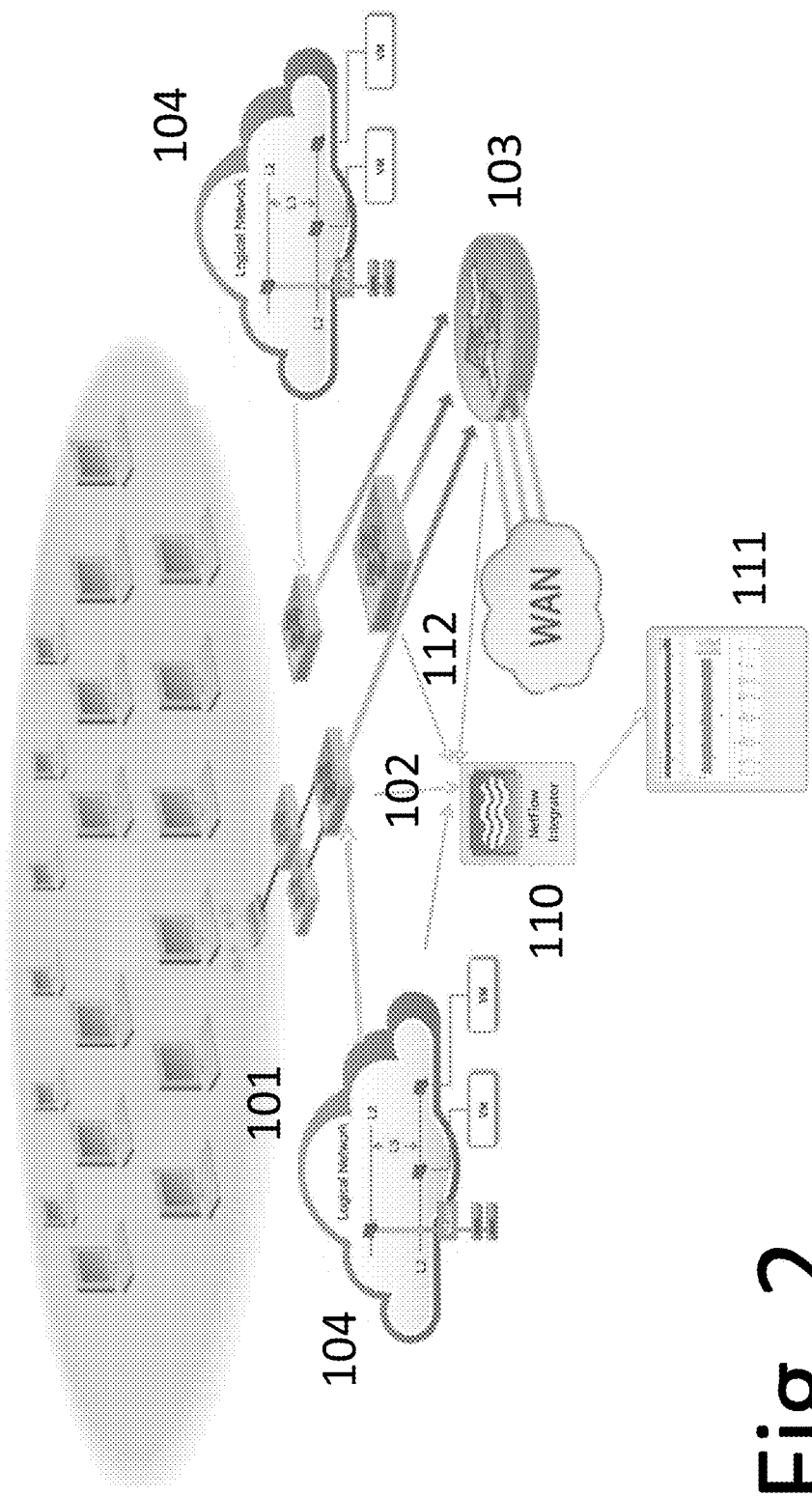
FIG. 2 illustrates an exemplary computer network as shown on FIG. 1, with the addition of a traffic data analyzer, NetFlow Integrator ("NFI") 110, which receives and analyzes network traffic data in the streaming mode and a generic back end system 111, which receives results of the analysis.

FIG. 2 illustrates an exemplary computer network as shown on FIG. 1 with the addition of a traffic data analyzer, NetFlow Integrator ("NFI") 110, which receives and analyzes network traffic data in the streaming mode and a generic back end system 111, which receives results of the analysis. In one embodiment of this invention, information about the network traffic is collected using the NetFlow protocol 112.

In one embodiment of the invention, a network node health assessment method may adhere to the following procedure:

1. Establish a traffic data collection interval, dt. In one embodiment of the method, the data collection interval length may be selected to be between 10 and 60 sec.

2. Establish a traffic observation interval, T. T is a multiple of dt: $T=N*dt$. In one embodiment of the method, traffic observation interval length is selected to be between 20 to 40 multiples of dt. In an exemplary embodiment which utilizes a change detection method based on the wavelet series algorithm, the multiple is $N=2n$ due to the wavelet transform requirements. Thus in one embodiment of the method, $N=32$ may be selected.

3. Collect multivariate information about traffic passing through a network interface over a data information collection interval, dt. In an exemplary embodiment, the plurality of collected network traffic parameters is comprised without limitation of traffic volume and packet rate measurements.

4. The observations may be repeated N times: $R1, \ldots, RN$, (with Ri—being information collected during i-th interval).

5. At the end of the collection time interval N+1, at least one change detection method is applied to the time series $R2, \ldots, RN+1$ directly or, in case of the wavelet transform, in conjunction with the time series $R1, \ldots, RN$ used as a template.

6. Identify change points detected by each applied change detection method and compute network Node Health Score ("NHS") for each data collection interval, starting from the rightmost identified change point data collection interval to the current data collection interval.

7. Estimate a network interface NHS value as a NHS value computed for the current data collection interval.

8. Estimate a network interface NHS trend, based upon a NHS value variation pattern over data collection intervals starting from the rightmost identified change point data collection interval to the current data collection interval.

It should be appreciated that the duration of a data collection interval, dt, is a configurable parameter and may be fine-tuned depending on the user's desired degree of awareness and/or precision. By selecting a shorter data collection interval, the user may benefit from earlier notifications about a negative NHS value trend, at the cost of possibly receiving extraneous notifications about short spikes in the network traffic that may not be significant. Selection of a prolonged data collection interval filters out short network traffic spikes but may delay delivery of notifications.

It should be appreciated that a significant benefit of this embodiment of the invention stems from contextual monitoring of the node health trend which enables assessing the network failure risk. It should also be appreciated that the disclosed method can be fully operational after N+1 data collection intervals, which in practice may span as little as 15-20 minutes. Accordingly, the method and system of this embodiment may be deployed and become operable almost immediately, without delays associated with establishing long and unreliable historical baselines.

Observed Data Pretreatment

It should be appreciated that short-lived, sharp changes in the observed network data may lead to an increased appearance of false positives. In order to mitigate this potential problem, an exponential smoothing process may be applied to the observed data:

$$\tilde{X}(i)=\alpha X(i)+(1-\alpha)\tilde{X}(i-1), \tilde{X}(0)=X(0), \text{ in which}$$

$\tilde{X}(i)$—is the smoothed i-th observation value $X(i)$—is the actual i-th observation value $\alpha$—is the smoothing coefficient. In an exemplary implementation, the smoothing coefficient may be $\alpha=0.35$, or other value preferred by the operator, based upon factors such as a desire for more reliable indications versus a desire for earlier indications of potential network trouble.

Network Node Health Score (NHS)

Figure 3:
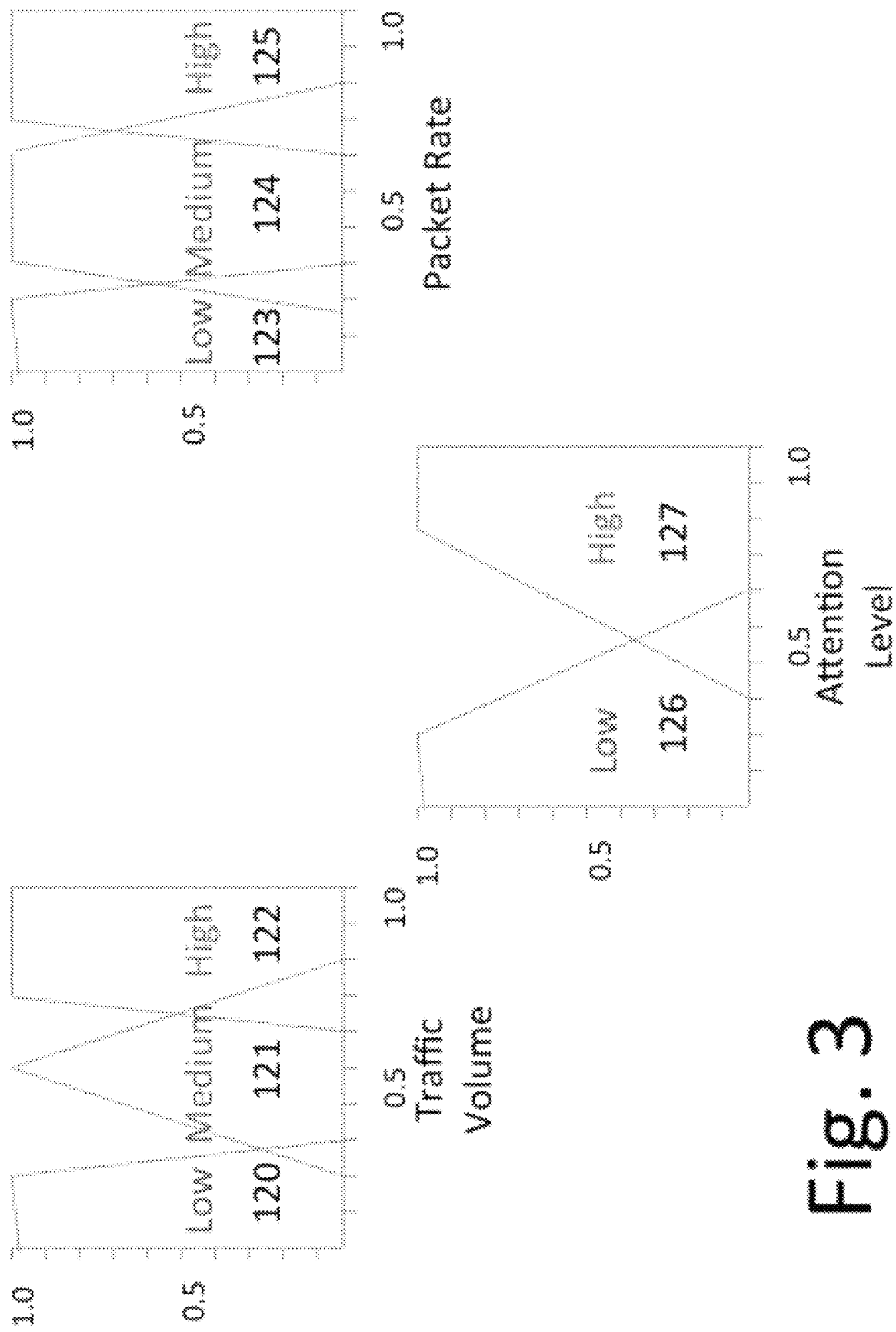
FIG. 3 illustrates exemplary fuzzy classifiers that may be used to characterize network traffic flowing through a network node.

In the disclosed embodiment, the Node Health Score (NHS) may be a single metric which provides guidance about the condition of a particular network node, such as a network device interface. FIG. 3 illustrates exemplary fuzzy classifiers that may be used to characterize network traffic flowing through a network node. The x-axis of each fuzzy classifier may represent the relative value of the classified parameter on the [0, 1] interval where the value of 1 is reached when the parameter reaches its maximal value. The y-axis of each fuzzy classifier may measure a degree to which a given parameter value belongs to a certain linguistic classification.

Referring to FIG. 3, the Traffic Volume fuzzy classifier may represent linguistic classifications of the traffic volume flowing through the network node. The areas marked Low 120, Medium 121 and High 122 correspond to the traffic levels which linguistically could be characterized as low, medium and high, respectively.

Further referring to FIG. 3, the Packet Rate fuzzy classifier may represent linguistic classifications of the rate at which the packets are flowing through the network node. The areas marked Low 123, Medium 124 and High 125 correspond to the packet rate levels which linguistically could be characterized as low, medium and high, respectively.

Further referring to FIG. 3, the Attention Level fuzzy classifier may represent linguistic classifications of the operator's attention level which the network node requires. The areas marked Low 126 and High 125 correspond to the different degrees of the operator's attention which linguistically could be characterized as normal and troublesome, respectively.

In the first step of the network node health assessment, the disclosed method may input relative values of the observed network traffic characteristics ("crisp inputs") through the node and find a degree to which each of the observed values belongs to a certain linguistic category in its universe of discourse.

Figure 4:
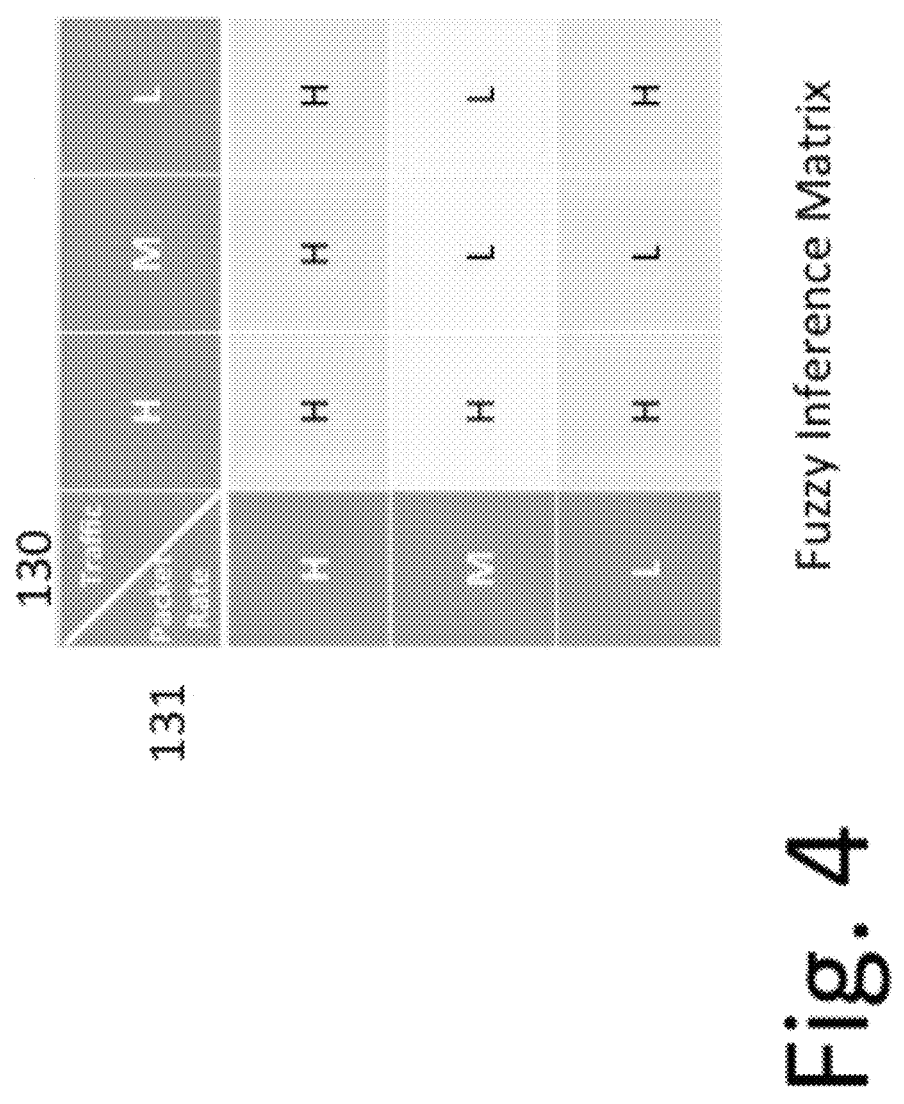

In the second step of the network node health assessment, the disclosed method may input the computed degree to which each of the observed values belongs to a certain linguistic category in its universe of discourse and map these values onto the Attention Level fuzzy classifier using a fuzzy inference matrix presented on FIG. 4. The method may include a step of computing the required attention level value, AL, e.g., using Mamdani and Sugeno fuzzy inference methods. The Node Health Coefficient may be computed as:

NHS=1−AL

Referring to FIG. 4, the exemplary fuzzy inference matrix may map observed traffic parameters linguistic values to the Attention Level universe of discourse. In the exemplary fuzzy inference matrix shown in FIG. 4, the rows correspond to the observed relative packet rate values and the columns correspond to the observed relative traffic volume passing through the node, wherein each cell represents a linguistic value of a corresponding fuzzy classification rule:

IF Traffic Volume is X AND Packet Rate is Y THEN Attention Level is Z

For example, when the traffic volume through the network node is linguistically classified as low ("L") and the rate of packets flowing through the network node is linguistically classified as low ("L"), then the attention level required to this node might be classified as high ("H")—indicating a high probability that a lightly loaded network node is experiencing hardware problems.

Figure 5:
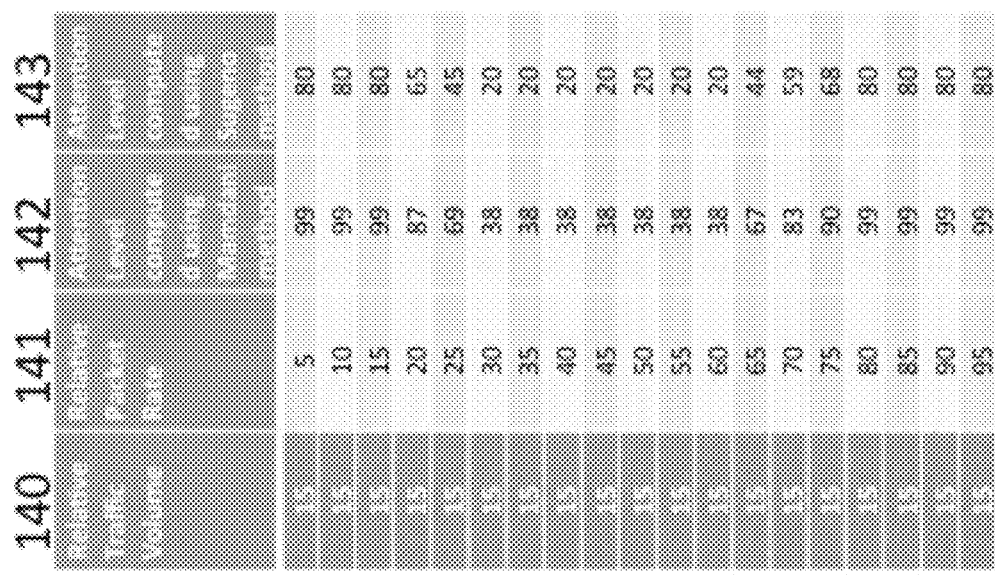
FIG. 5 provides an exemplary result of the attention level computation at a constant traffic volume and variable relative packet rate in 5% increments.

FIG. 5 provides an exemplary result of the attention level computation at a constant traffic volume 140 and variable relative packet rate in 5% increments 141. The results of attention level computation scaled to the interval [0, 100] using the Mamdani and the Sugeno methods are presented in columns 142 and 143, respectively. In an exemplary implementation of the disclosed method, the effective attention level value, $\overline{AL}$, is computed as an average of attention level value computed using the Mamdani method, $\overline{AL}_M$, and the attention level value computed using the Sugeno method, $AL_S$:

$$\overline{AL} = \frac{AL_M + AL_S}{2}$$

It should be appreciated that fuzzy classifiers shown on FIG. 3 are exemplary and may include other linguistic classifications such as "very" or have other linguistic classifications altogether. It should be also appreciated that a fuzzy inference matrix shown on FIG. 4 is exemplary and without limitation may include additional linguistic classifications and observation domains.

Computing Relative Node Load

Network Node Health Score (NHS) computation may involve expressing traffic parameters in relative terms. In the exemplary embodiment of the disclosed method, relative traffic volume passing through a network node may be computed as:

$$\overline{T} = \frac{3B}{T_{max}\,dt},$$

in which

B—is the bidirectional IP Level 3 traffic volume through the network node during the data collection interval, (in bytes)

$T_{max}$—is the maximal nominal speed of the node, (in bits/sec "bps"), and dt—is the data collection interval, (in sec).

In the exemplary implementation of the disclosed method, relative rate at which network packets flow through a network node may be computed as:

$$R = \frac{T_{max}}{sS},$$

in which $\overline{S}$—is the average network packet size during the data collection interval, (in bytes):

$$\overline{S} = \frac{B}{P} + L2,$$

in which

P—is the number of packets in both directions observed during the data collection interval For an IP-based network, Layer 2=41–the size of the Layer 2 header (17 bytes), the size of the inter-frame gap (12 bytes) and the size of the preamble (8 bytes). The size of the Layer 2 information may be taken as an average of a standard Layer 2 header (14 bytes), Layer 2 header with a VLAN tag (16 bytes) and a Layer 2 header with MPLS labels (20 bytes).

It should be appreciated that that the above computations are exemplary and relative traffic volume and relative rate at which network packets flow through a network node may be computed using a different formula.

Change Point Detection Algorithms

Change detection is a statistical analysis approach which attempts to identify changes in the probability distribution of a stochastic process or time series. In general the change detection problem implies detecting whether or not one or more changes have occurred and identifying the times of such changes.

In an exemplary embodiment, the Cumulative Sums ("CUSUM") algorithm, the wavelet transform ("wavelet") and the Support Vector Machine ("SVM") algorithm may be applied to the observed traffic characteristics of network traffic flowing through a network node. The purpose of applying a plurality of change point detection algorithms is to achieve a confident detection of a change. It is appreciated that other change point detection algorithms may be applied to the observed network traffic characteristics and the choice of the CUSUM, the wavelet and the SVM algorithms is exemplary.

Cumulative Sums (CUSUM) Algorithm

Figure 6:
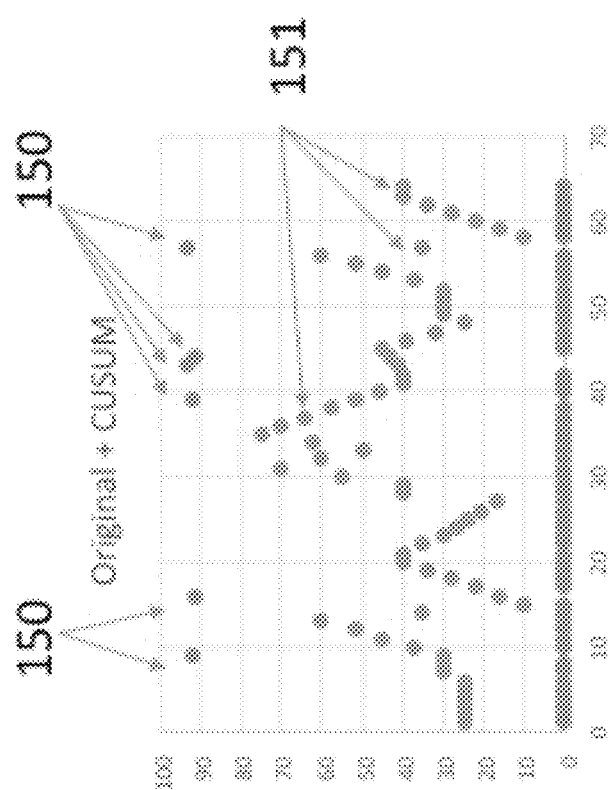
FIG. 6 illustrates a result of the CUSUM algorithm applied to a sample observed data set.

FIG. 6 illustrates a result of the CUSUM algorithm applied to a sample observed data set 151. Dots 150 indicate change points discovered by the CUSUM algorithm in the evaluated original data set 151. Further referring to FIG. 6, in an exemplary rendering, the y-axis represents a change point confidence metric (0-100)—the closer this metric's value is to 100 the more confidently a change point has been identified.

Wavelet Transform Algorithm

Figure 7:
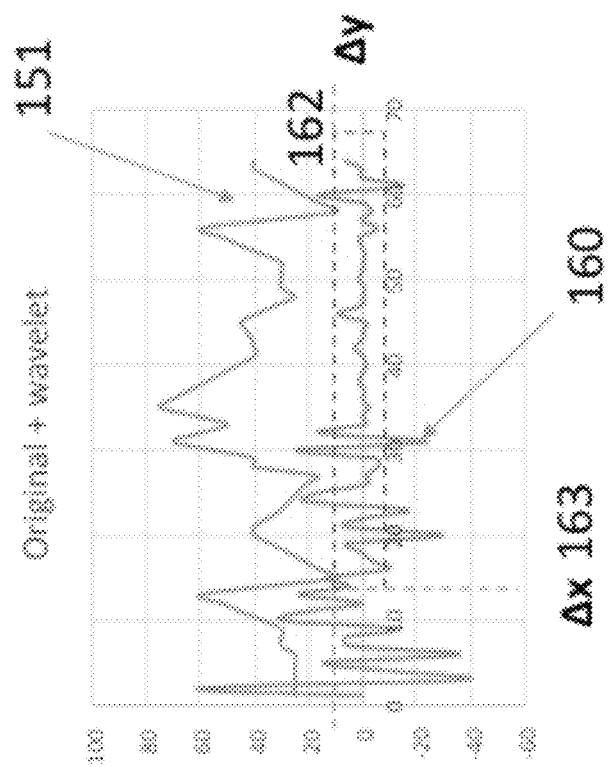
FIG. 7 illustrates a result of the wavelet transform applied to a sample observed data set.

FIG. 7 illustrates a result of the wavelet transform applied to sample observed data set 151. The wavelet transform of the original data 160 normalizes observed values 151 around y=0 and filters out high frequency components, commonly known as noise, in the observed values 151. A change point is a point where an absolute value of the transformed data exceeds a certain preset threshold value yT, |yT|=Δy, 162. It should be appreciated that change point detection probability increases with the larger absolute value of the transformed data, yT.

Due to an artificial abrupt change at the start of the observation interval, deviations identified on a few leftmost data collection intervals, Δx, 163 are preferably discarded. Per algorithm definition, the number of the data collection intervals, N, to which the wavelet transform is applied should be equal to 2n, where n is a whole number (e.g., N=32, n=5).

Support Vector Machine (SVM) Algorithm

Figure 8:
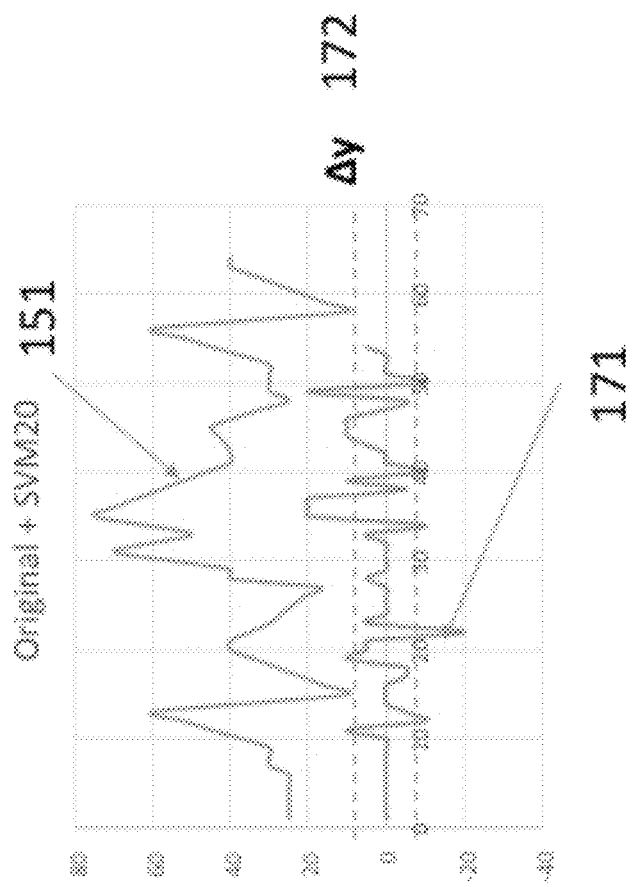
FIG. 8 illustrates a result of the SVM method applied to sample observed data set.

SVM is a classification method which identifies similarity of disparate observations. SVM uses a first data set as a template and classifies a second data set against a first data set. FIG. 8 illustrates a result of the SVM method applied to sample observed data set 151.

As with the wavelet transform illustrated on FIG. 7, the SVM classification algorithm includes selection of a threshold value, Δy, 172 for identifying abrupt changes in the transformed data 170. It should be appreciated that a threshold value 172 selected for the data transformed by SVM algorithm 170 is unrelated to a threshold value 163 selected for the wavelet transform algorithm.

Network Node Health Assessment

Figure 9:
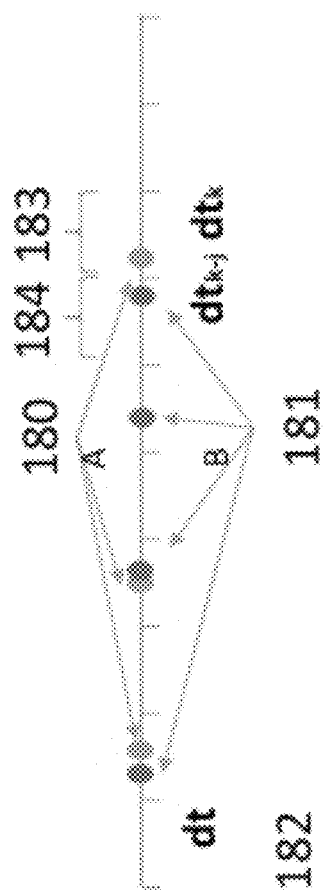
FIG. 9 illustrates an exemplary embodiment of the invention, in which changes in two data observation domains, A and B, are evaluated.

Referring to FIG. 9, in an exemplary embodiment of the disclosed method, a network node health metric may be computed for the data collection intervals, dt, 182, starting with a rightmost detected change point through the current data collection interval. FIG. 9 illustrates an exemplary embodiment of the method, in which changes in two data observation domains, A and B, are evaluated. The method disclosed herein may be extended without limitation to an arbitrary number of data observation domains.

Further referring to FIG. 9, if a case is encountered in which change points were detected in all observation domains, then NHS is computed for the data collection domains starting from the rightmost data collection interval on which a change point was detected. For example, referring to FIG. 9, if change point in domain A 180 was detected at data collection interval dtk 183 and change point in domain B 181 was detected at data collection interval dtk-j 184, j>0, then NHS is computed for all data collection intervals between dtk and the current data collection interval inclusive.

In a case in which there is a change point in one data domain only, NHS may be computed for all data collection intervals starting with the rightmost data collection interval on which change point in the observed data was detected to the current data collection interval inclusive. In a case in which no change points were detected, NHS may be computed for the current data collection interval only.

Network Node Health Trend Evaluation

Figure 10:
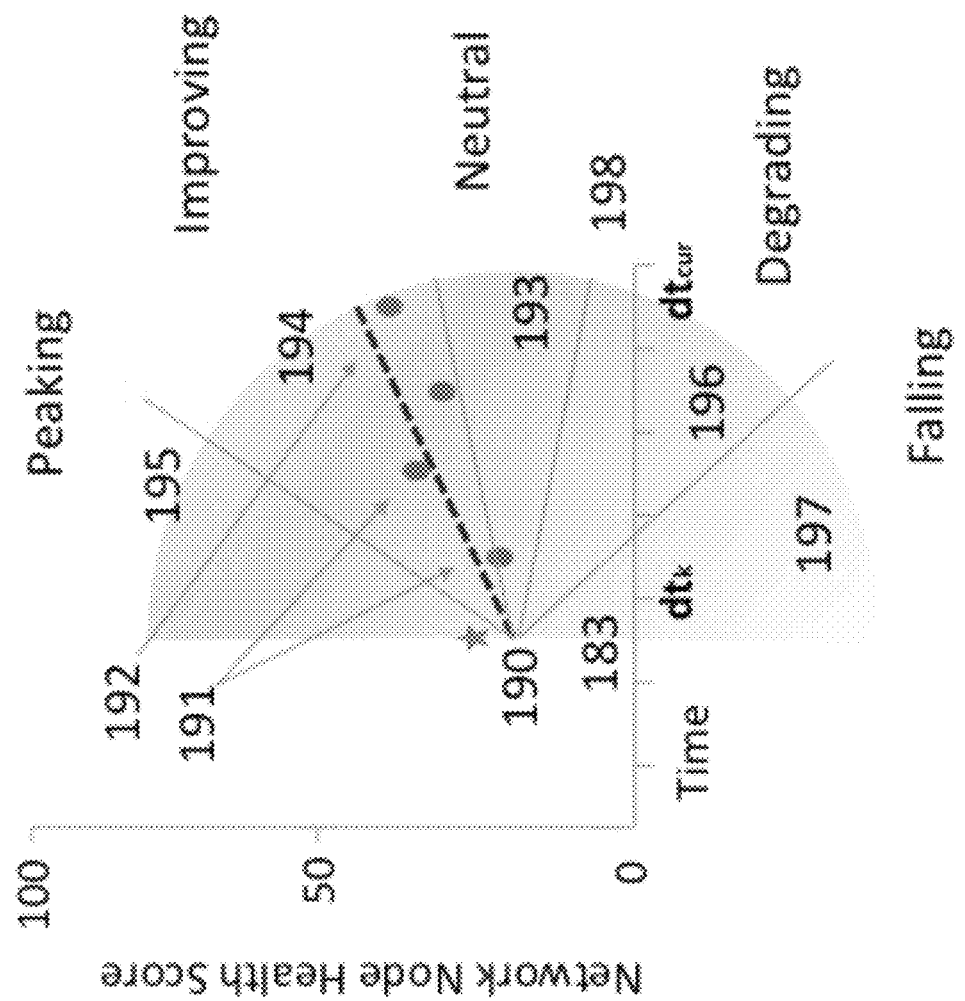
FIG. 10 illustrates an exemplary embodiment of the disclosed invention, in which the network node health trend is evaluated using assessed network Node Health Score (NHS) values between data collection intervals dtk and dtcur.

Referring to FIG. 10, in an exemplary embodiment of the disclosed method, network node health trend is evaluated using assessed network Node Health Score (NHS) values between data collection intervals dtk 183 and dtcur 198, where data collection interval dtk 183 is a data collection interval on which the last change point in the current observation interval 190 was observed and dtcur 198 is the current data collection interval.

Further referring to FIG. 10, network node health trend may be associated with the slope of a best-fit line 192 drawn between the points 191 representing network Node Health Score (NHS) values on each data collection time interval, starting with the data collection time interval 183, where the last change point in the current observation interval 190 was detected. In an exemplary implementation, best-fit line 192 is calculated using the Total Least Square ("TLS") method. It should be appreciated that a fitting method other than TLS could be used for that purpose.

Further referring to FIG. 10, network node health trend may be classified into distinct qualitative categories, e.g., called Peaking 195, Improving 194, Neutral 193, Degrading 196 and Falling 197, based on the slope of the best-fit line 192. In a degenerate case in which the last change point in the current observation interval 190 was detected during the current data collection interval dtcur 198, the network node health trend may be classified as Neutral.

Further referring to FIG. 10, the exemplary depicted network node health trend expressed using a best-fit line 192 illustrates a case when the network node health trend falls into the Improving 194 category. The Improving 194 trend classification is attributed to the fact of continuing steady growth of the NHS values 191 since most recent observed change point.

Figure 10A:
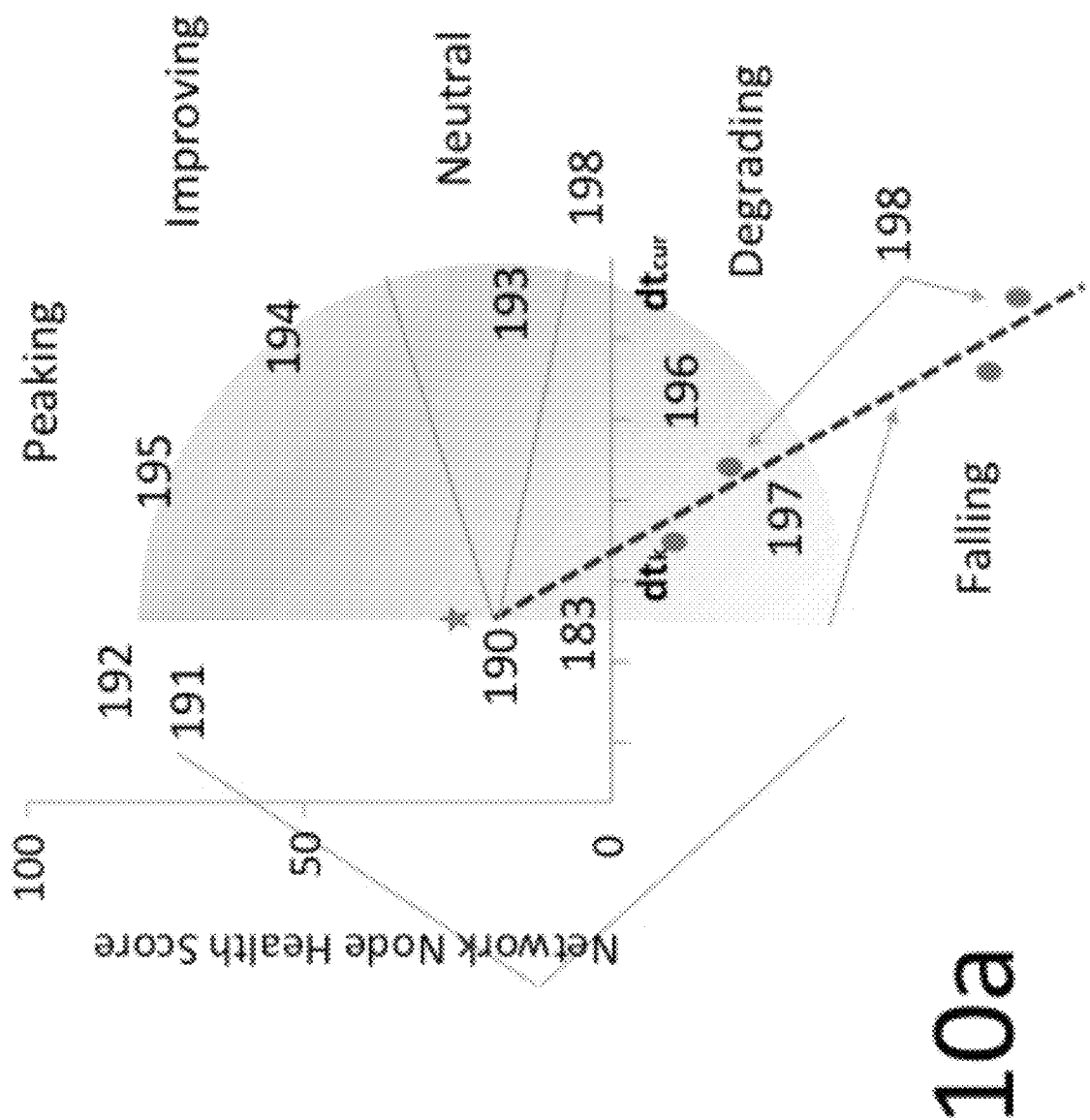
FIG. 10(a) illustrates an exemplary embodiment of the disclosed invention, in which network node health trend is expressed using a best-fit line to illustrates a case in which the network node health trend falls into the Falling category.

Referring to FIG. 10a, the exemplary depicted network node health trend expressed using a best-fit line 199 illustrates a case when the network node health trend falls into the Falling 197 category. The Falling 197 trend classification is attributed to the fact of a precipitous drop of the Network Node Score (NHS) values 198 since most recent observed change point.

Network Device Health Assessment

Figure 10B:
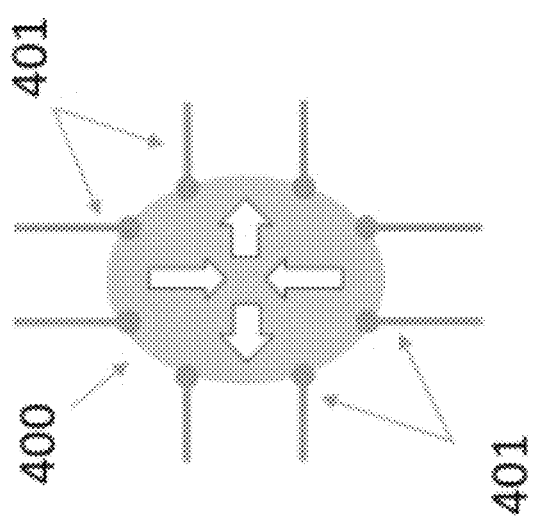
FIG. 10(b) illustrates an exemplary embodiment of the disclosed invention, in which the network Node Health Score (NHS) is broadened to quantify the health of a network device as a whole.

Referring to FIG. 10b the notion of the network Node Health Score (NHS) may be further broadened to quantifying health of a network device 400 as a whole. In an exemplary embodiment of such computation NHS of a network device, NHSD, may be assessed as a minimal NHS of the devices' network nodes 401:

$$NHS_D = \min(NHSf), i=1, \ldots, n, \text{ where}$$

$NHSf$—Network Health Score of the i-th devices' node and n—a total number of the network nodes deployed on the device.

Further referring to FIG. 10b the above exemplary quantification of a network device 400 NHS is justified by the fact that network nodes 401 deployed on the device 400 are an integral part of the device 400 and, as such, are interdependent and performance of each network node 401 is affected by performance of the other network nodes deployed on the device.

Further referring to FIG. 10b it should be appreciated that other approaches to quantification of a network device 400 health assessment, such as associating a relative weight of each network node 401 based on the network node nominal throughput, may be considered.

Network Service Availability Assessment

Figure 10C:
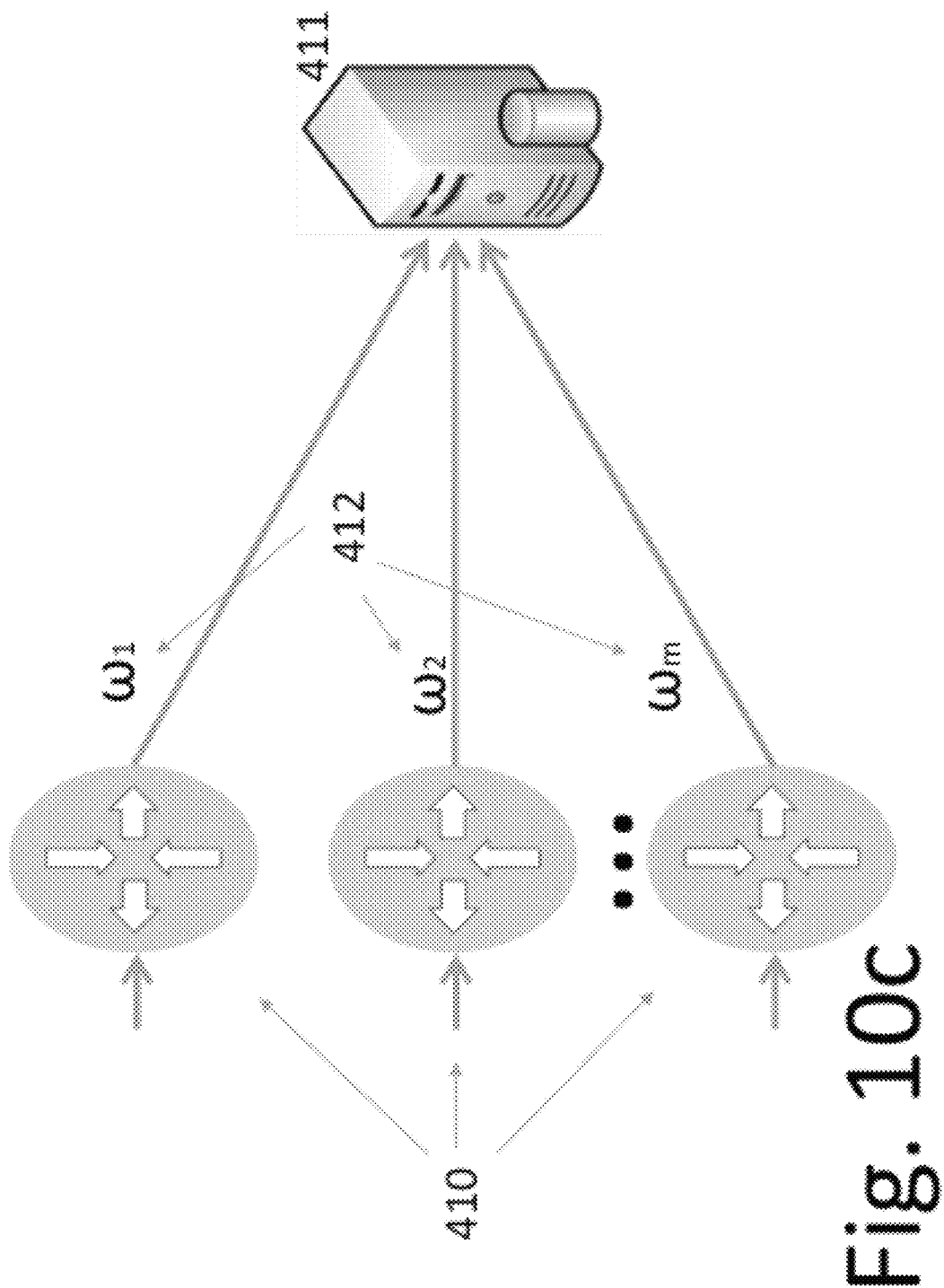
FIG. 10(c) illustrates an exemplary embodiment of the disclosed invention, in which the network Node Health Score (NHS) is broadened to quantify the health of a network service.

Referring to FIG. 10c in the universe of discourse of this invention network devices 410 are one or a plurality of intermediaries, such as, without limitation, routers, switches and firewalls, which pass network traffic to the network service 411. A network service 411 is an application running at the network application layer that provides data processing, storage, presentation and other capabilities via application layer network protocols.

Further referring to FIG. 10c, network service 411 availability is conditional on the availability of the network devices 410 which forward network traffic to the network service 411. In case of a network device 410 poor performance or in a case of a network device 410 failure availability of a network service is degraded or it becomes inaccessible. Due to the importance of the network services 411 to the enterprise business it is important to detect failures in the network paths leading to the network service 411 and quantify its availability based on health of said network paths.

Further referring to FIG. 10c consider a network service 411 with m network paths 412 over which network traffic is flowing to and from the service. In the spirit of this invention availability of the network service 411 may be expressed using the network Node Health Score (NHS). In an exemplary embodiment the NHS value of a network service 411 availability, $NHS_{svc}$, may be computed as a weighted average of the NHS values of each network device 410 which forwards network traffic to the said network service 411:

$$NHS_{svc} = \frac{1}{m}\sum_{i=1}^{m} \omega_i NHS_D^i,$$

where

NHSb—Network Health Score of an i-th network device 410 which forwards network traffic to the network service 411 m—a total number of network devices 410 forwarding network traffic to the network service 411

ωi—a share of the network traffic flowing to and from the network service 411 through each network device 410. The share is computed by observing the network traffic flows to and from the network service 411 through the i-th network device 410, Vi, summing up network traffic volume in each flow over a data collection period and dividing it by a total traffic volume to and from the network service 411, V, over the data collection period:

$$w_i = \frac{V_i}{V},.$$

Network service's NHS value computation provides a robust mechanism for reporting condition of the networked resources to the network operator.

It should be appreciated that other approaches to quantifying a network service availability, such as including nominal performance of the network devices in the device weight computation, may be considered.

Detecting Anomalous Traffic

A Denial of Service ("DoS") attack is an attempt to make a network resource unavailable to its intended users. A Distributed Denial of Service ("DDoS") attack is a variant of a DOS attack in which multiple compromised systems are used to target a single system and cause a DoS attack.

During a DDoS attack, the incoming traffic flooding the target typically originates from many different sources, making it difficult to distinguish legitimate user traffic from the attack traffic spread across a great number of points of origin.

Figure 11:
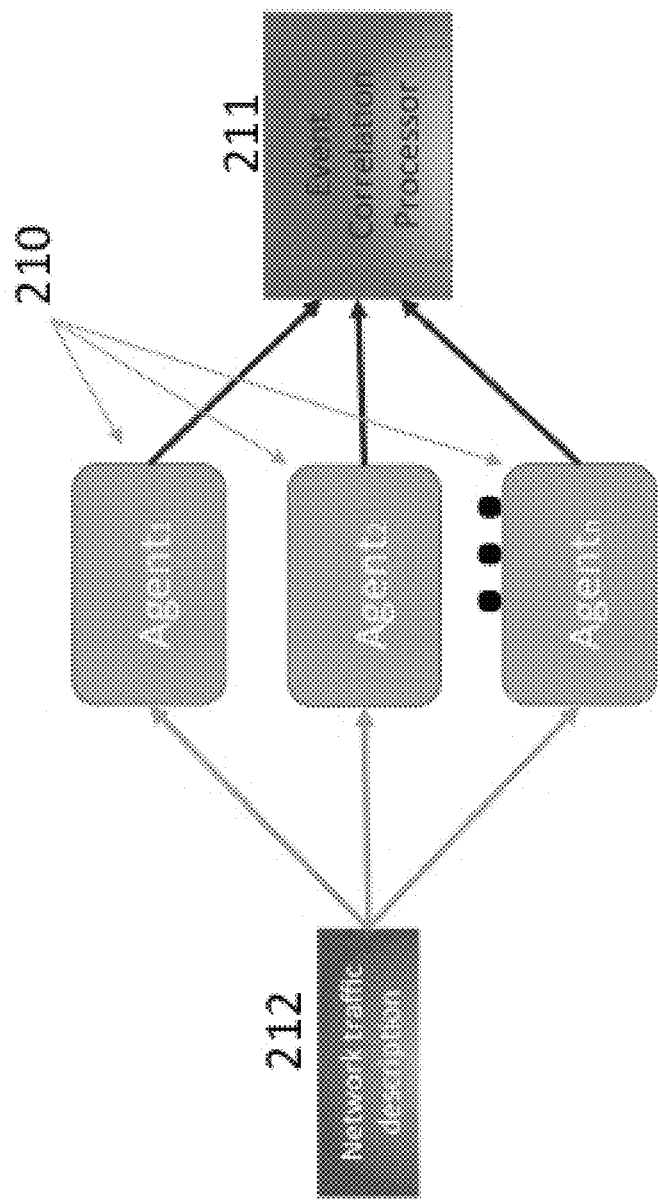
FIG. 11 illustrates an embodiment of the invention applied to detecting and reporting DDoS attacks while minimizing the number of false positives.

In an exemplary embodiment, a method disclosed herein may be applied to detecting and reporting DDoS attacks while minimizing the number of false positives. Referring to FIG. 11, the disclosed method utilizes network traffic description 212 which contains information about network traffic and takes into account a plurality of the network traffic characteristics, each of which is evaluated by a plurality of specialized modules ("Agent") 210. A system which implements the disclosed method delivers information describing the network traffic to each Agent 210 and each Agent 210 may treat such information in a specialized fashion.

Further referring to FIG. 11, once an Agent 210 collects enough information to make a conclusion (or in response to a timer) the Agent 210 may report its findings to an Event Correlation Processor ("ECP") 211 which functions to make a final decision concerning whether the event is positive or whether the event is negative.

It should be appreciated that the collection of algorithms implemented in Agents 210 which provide input into the ECP 211 final decision making procedure may vary and algorithms other than disclosed herein may be used for providing such input. It should also be appreciated that a list of Agents 210 discussed in the following text is for the purposes of illustration only and does not constitute any limitations of the disclosed method.

While an exemplary embodiment of the method as disclosed herein analyzes network traffic throughout the network it should be appreciated that it may, without a limitation, be applied to the network traffic to a particular IP addresses thus detecting DDoS attacks targeting a particular network service or a plurality of network services.

Agent A: TCP/IP Traffic Analyzer

Further referring to FIG. 11, Agent A may specialize in detecting TCP/IP-based DoS flood attacks and reporting observations to ECP 211.

TCP/IP flood attacks are one of the most ubiquitous classes of DDoS attacks seen in practice. The most common type of a TCP/IP flood attack is a SYN flood attack during which the attacker sends a flood of TCP/IP SYN packets with source IP addresses of subverted hosts or spoofed IP addresses.

When a TCP/IP session is initiated between two communicating peers A and B, a standard TCP/IP SYN-SYN/ACK-ACK message exchange takes place. The initiator of this communication, A, first sends a TCP/IP SYN packet and the responder, B, responds with a TCP/IP SYN/ACK packet. Under normal circumstances, the initiator, A, then responds with a TCP/IP ACK packet and may start sending data to the responder, B. In a case in which the initiator, A, is a malicious entity, it may withhold sending the TCP/IP ACK packet to the responder, B, thus tying up the responder's resources allocated for creation of a new TCP/IP session.

It should be appreciated that other types of TCP/IP flood attacks, such as reflected SYN/ACK flood and TCP/IP FIN flood, exist and the method disclosed herein is also applicable to those types of attacks without any limitations.

Agent A monitors the number of incomplete TCP/IP sessions—that is, initiated TCP/IP sessions in which the responder, B, did not receive a TCP/IP ACK packet in response to a sent TCP/IP SYN/ACK packet. For example, Agent A may compute the number of unanswered TCP/IP SYN/ACK responses on each data collection interval, dt.

In an exemplary embodiment, in order to detect a nascent TCP/IP SYN flood attack, a sliding observation interval $T=dt \times N$, N—a whole number, may be selected. Such selection creates a plurality of the observed data values changes in which are analyzed. The CUSUM algorithm may thereafter be applied for identifying the change points in the series of the counts of incomplete TCP/IP sessions for each data collection interval, dt.

Figure 12:
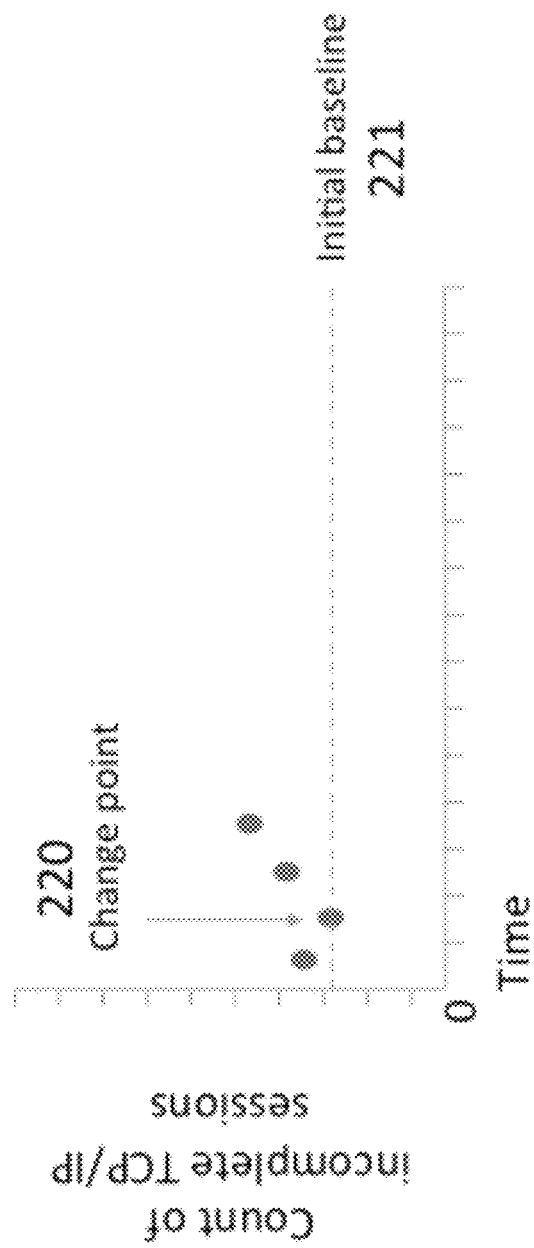
FIG. 12 illustrates an embodiment of the invention in which, after a first change point from the start of the observation process is detected, the count of observed incomplete TCP/IP sessions may become an initial baseline value for subsequent measurements.

Referring to FIG. 12, when a first change point 220 from the start of the observation process is detected, the count of observed incomplete TCP/IP sessions may become an initial baseline value 221, b0, for subsequent measurements. It should be appreciated that methods other than selection of a value corresponding to the first change point 220 may be used for establishing an initial baseline value. The approach described herein is exemplary and could be replaced by setting a fixed initial baseline value, taking an average value of the data collection intervals prior to the first change point 220, and/or other methods.

Figure 13:
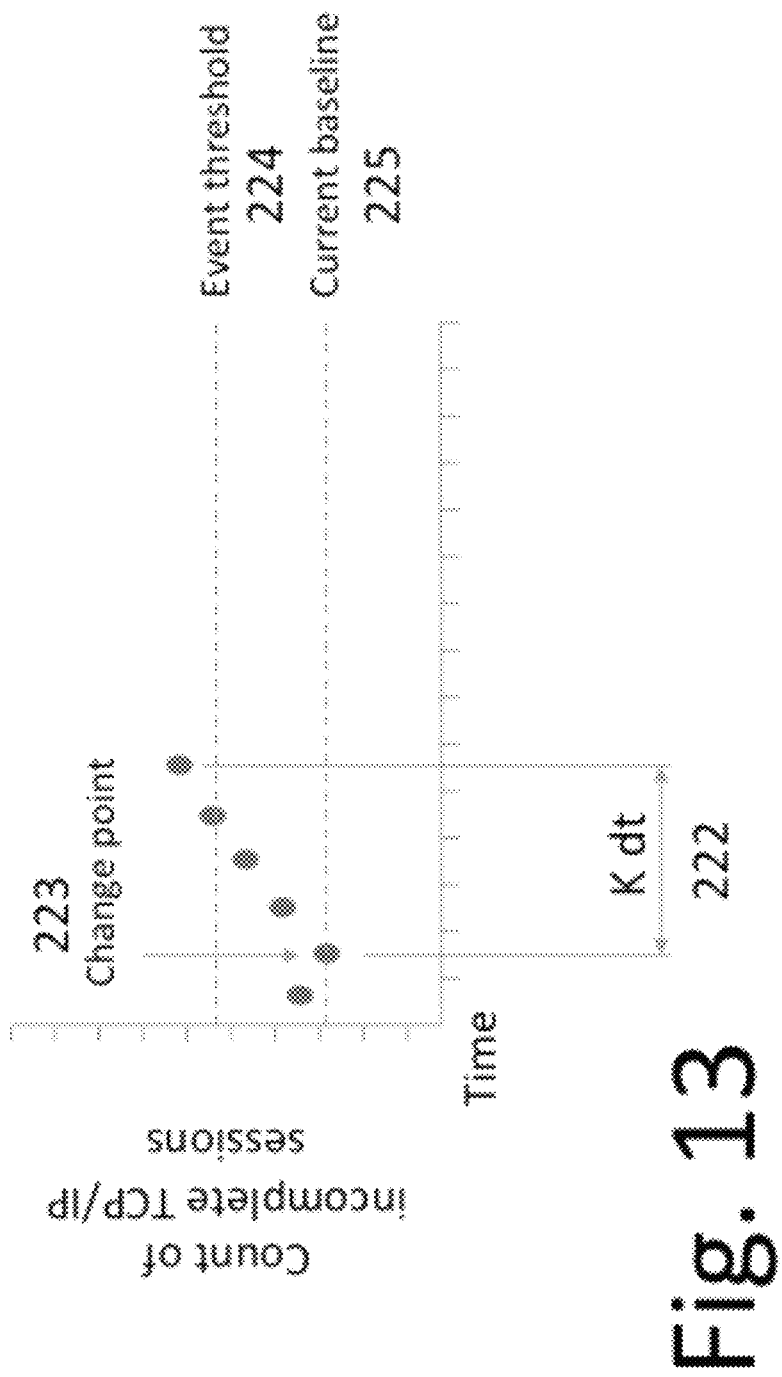
FIG. 13 illustrates an embodiment of the invention in which, after one or a plurality of change points is detected, the next K observations immediately following a rightmost detected change point may be checked for exceeding a pre-configured threshold value over the current baseline value.

Referring to FIG. 13, in a case in which one or a plurality of change points is detected, the next K observations 222 immediately following a rightmost detected change point 223 may be checked for exceeding a pre-configured threshold value, δ, 224 over the current baseline value 225. Agent A may report an event if, for example, one of the following conditions are satisfied:

$$C_K \geq C_{K-1} \geq \ldots \geq C_0 \qquad 1)$$

$$\text{ave}(C_i) \geq C_0, i=1, \ldots, K \qquad 2)$$

in which $C_0$—is the number of incomplete TCP/IP sessions at change point 223

$C_i$—is the number of incomplete TCP/IP sessions during the i-th successive data collection interval, dt, $i=1, \ldots, K$ ave—is the average function.

Figure 14:
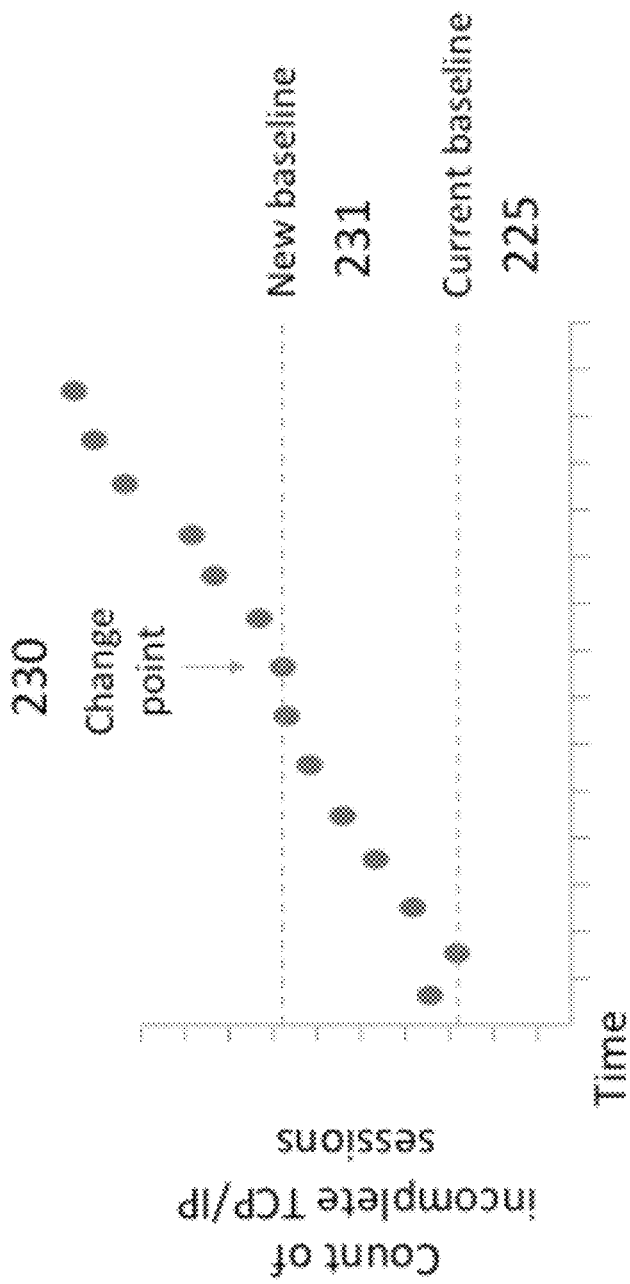
FIG. 14 illustrates an embodiment of the invention in which, when a subsequent change point is detected, a new baseline value may be established and a previous current baseline value may be pushed on the stack of known baseline values.

Referring to FIG. 14, when a subsequent change point 230 is detected, a new baseline value 231 may be established and a previous current baseline value 225 may be pushed on the stack of known baseline values.

Figure 15:
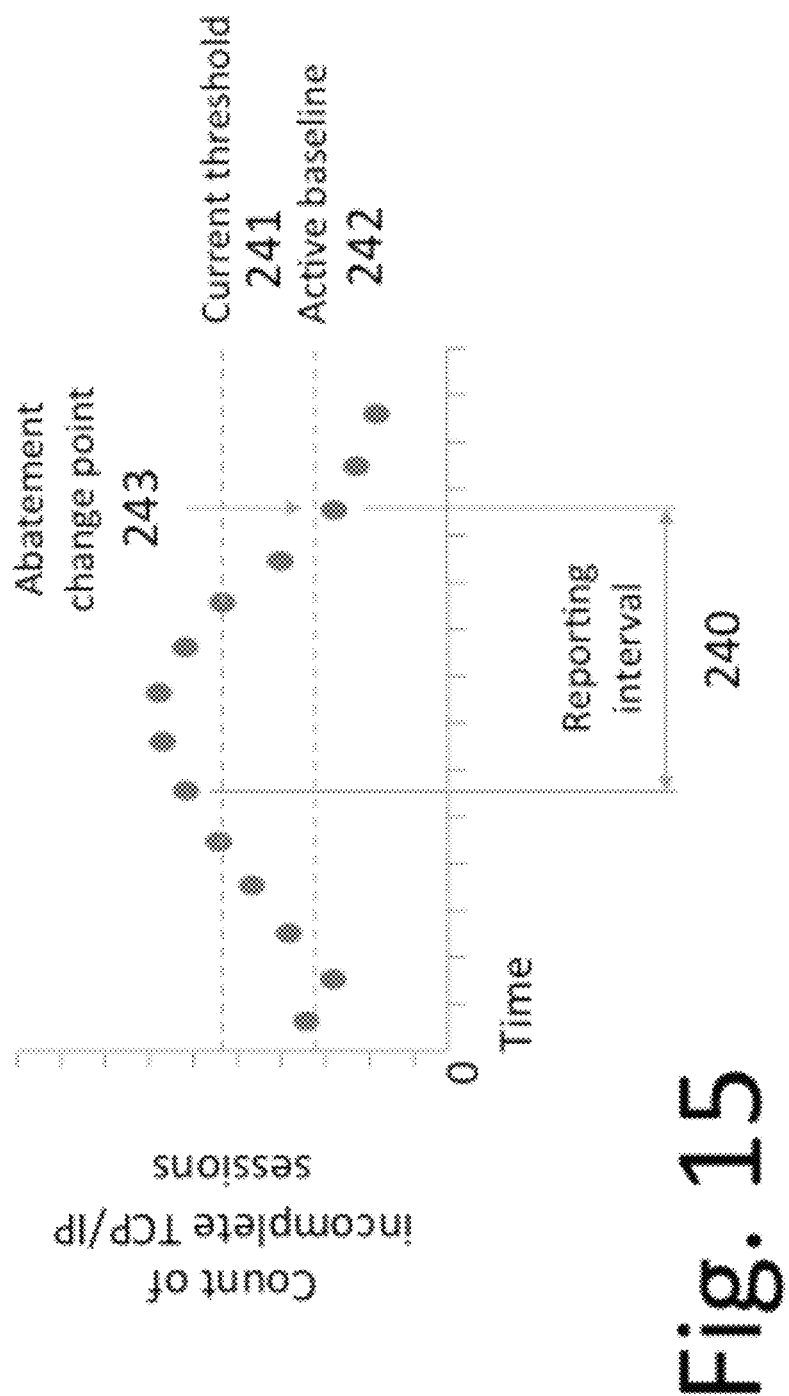
FIG. 15 illustrates an embodiment of the invention in which an Agent may report the number of observed incomplete TCP/IP sessions over a reporting interval.

Referring to FIG. 15, Agent A may report the number of observed incomplete TCP/IP sessions over a reporting interval 240, which may start at the first data collection interval when the number of observed incomplete TCP/IP sessions exceeded a current threshold value 241, until a detected abatement change point 243 when the number of observed incomplete TCP/IP sessions falls below the currently active baseline 242.

Further referring to FIG. 15, when an abatement change point is detected, a baseline value at the top of the stack of known baseline values may be extracted and its value then becomes a currently active baseline 242. In a case in which the stack of known baseline values is not empty, Agent A may continue reporting the number of observed incomplete TCP/IP sessions. If the stack of known baseline values is empty, Agent A may discontinue reporting.

Agent B: Generic Network Traffic Characteristics Analyzer

Agent B may be an intelligent analyzer of network traffic characteristics. Agent B may monitor and analyze traffic for the IP layer protocols which cause an overwhelming majority of the DoS attacks. In an exemplary embodiment, Agent B monitors and analyzes network traffic which utilizes the TCP/IP, UDP and ICMP protocols. It is appreciated that Agent B may monitor, without limitation, traffic characteristics of other IP layer protocols such as GRE, IGMP and others.

When monitoring network traffic characteristics, Agent B operates on consolidated units of information herein referred to as "flow". In an exemplary embodiment, a flow is a unidirectional sequence of network packets characterized by an IP layer protocol and its source and destination points. It is appreciated that other network traffic characteristics such as Type of Service (ToS), Autonomous System Number (ASN) or similar information may characterize a flow.

The following network traffic characteristics may be assessed for each monitored IP layer protocol for the duration of each collection time interval, dt:

1) average number of bytes per packet
2) average number of packets per flow
3) average number of bytes per flow, and
4) the number of unique source IP addresses.

In order to detect changes in the network traffic characteristics, a sliding observation interval T may be selected:

$$T=dt \times M, M=2^n,$$

in which n is a whole number. At the end of the observation time interval T, the wavelet transform may be applied to each of the M collected sequences of characteristics (1)-(4). Collection time intervals, dt, on which a transformed value of a characteristic exceeds a threshold, $\tau$, are preferably marked as suspicious.

In the exemplary embodiment, the following function is used to compute confidence value for each of collected network traffic characteristics (1)-(4):

$$C_j(X_i) = \begin{cases} 0, & y_i < \tau \\ 1 - \dfrac{\tau}{y_i}, & y_i \geq \tau \end{cases}$$

in which $X_i$—is the i-th data collection interval dt, and $y_i$—is the value of the transformed characteristic on the i-th time interval.

A correlated confidence metric may be calculated as a sum of individual confidence values:

$$\overline{C}(X_i) = \sum_{j=1}^{n} C_j(X_i)$$

Data collection intervals with the confidence metric exceeding a preset threshold, $\sigma$, may be designated as a candidate point of a network traffic anomaly.

In the exemplary embodiment, besides collecting network traffic characteristics (1)-(4), the following cumulative network traffic characteristics may be collected on each data collection interval, dt:

5) cumulative number of bytes
6) cumulative number of packets, and
7) cumulative number of observed flows.

Figure 16:
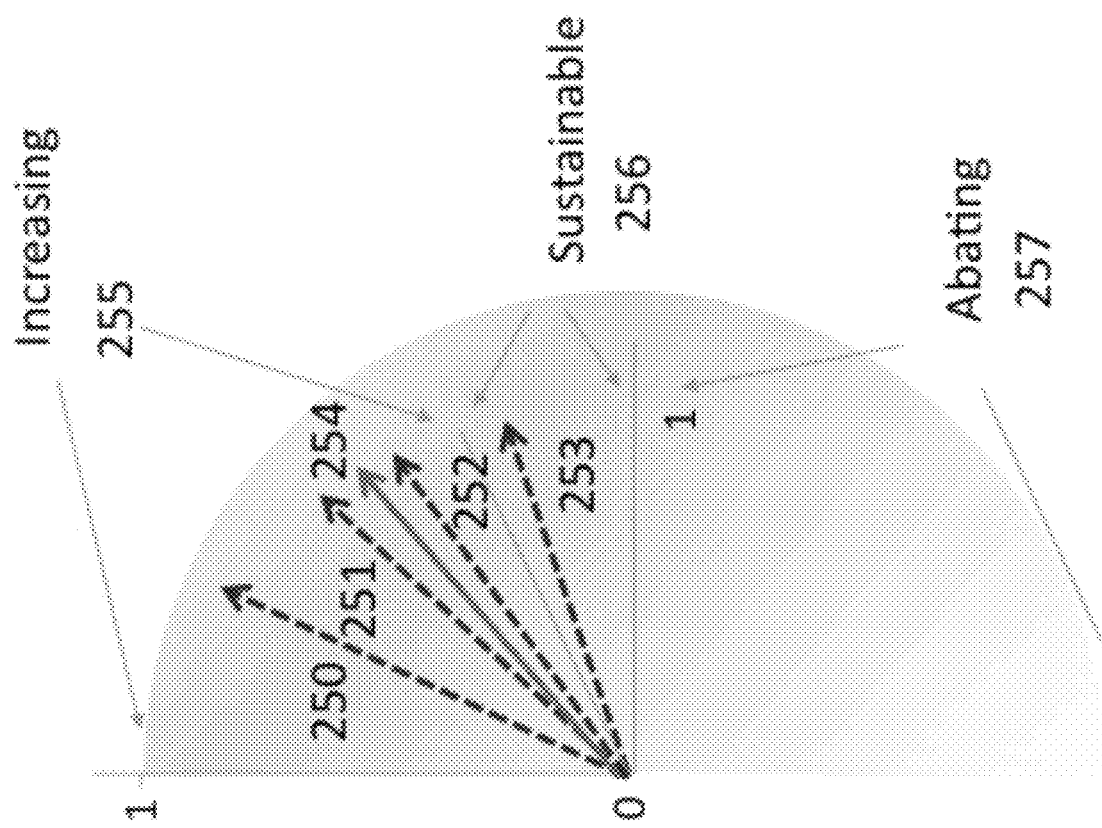
FIG. 16 illustrates an embodiment of the invention in which steps are taken to assess the nature of a network traffic anomaly.

Referring to FIG. 16, in order to assess the nature of the network traffic anomaly, the most recent observed candidate change point may be selected and the trend may be computed for each of the network traffic characteristics (4)-(7), 250-253, then each computed trend line may be treated as a unit vector and the overall trend 254 may be computed as a vector sum of network traffic characteristics trends 250-253.

Further referring to FIG. 16, in order to evaluate the overall trend 254 of the network traffic characteristics, the overall trend 254 is classified into a plurality of qualitative characteristics such as, without a limitation, Increasing 255, Sustainable 256 and Abating 257. If the overall trend 254 is classified into the Increasing 255 qualitative category, then Agent B preferably reports a network traffic anomaly event, along with values of the current network traffic characteristics (4)-(7) and the overall trend slope value.

It should be appreciated that the overall trend classification may differ from the classification in the exemplary embodiment, such that the Sustainable 256 category is optional or the classification framework may contain a greater number of qualitative categories.

Agent C: New IP Addresses Arrival Rate Analyzer

Since a DDoS attack is typically accomplished by means of subverted network hosts or by spoofing the source IP address in the network packets used to stage the attack, the onset of a DDoS attack is often characterized by an influx of previously unseen visitors. Agent C may observe changes in two observation domains in each data collection interval, dt:

8) new IP addresses arrival rate, and
9) the number of observed flows.

In order to detect changes in such network traffic characteristics, a sliding observation interval T may be selected:

$T = dt \times N$ in which N is a whole number and the CUSUM algorithm may be applied for identifying change points in the rate of arrival of new IP addresses and the observed flows count on each data collection interval dt.

Figure 17:
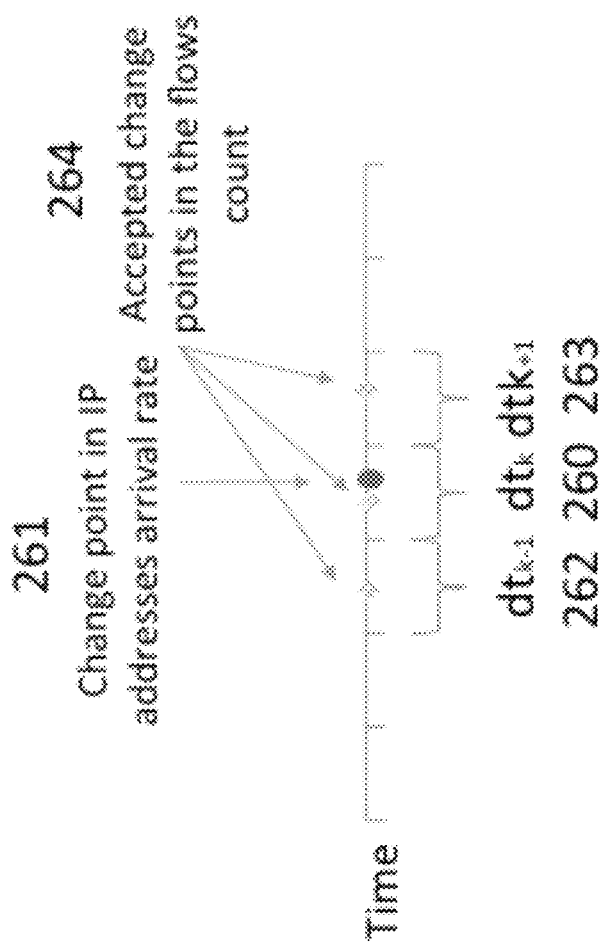
FIG. 17 illustrates an embodiment of the invention in which a data collection interval dtk may be designated as a network traffic anomaly if a change point is detected in the new IP addresses arrival rate and a change point is detected in the flows count in data collection intervals dtk dtk−1 or dtk+1.

Referring to FIG. 17, in an exemplary embodiment of the disclosed method, a data collection interval dtk 260 may be designated as a network traffic anomaly if a change point is detected in the new IP addresses arrival rate 261 and a change point is detected in the flows count 264 in data collection intervals dtk 260, dtk−1 262 or dtk+1 263.

It should be appreciated that by analyzing network traffic characteristics (8) and (9) as described herein, Agent C is able to provide a mechanism for differentiating a DDoS attack from a phenomenon called "flash mob" which is attributed to an influx of legitimate users. A typical example of flash mob is an increased traffic to a commercial web site when a new product is released or a spike in the network traffic at the beginning of a work day.

Further referring to FIG. 17, Agent C may differentiate between a flash mob and a DDoS attack by imposing a requirement that a change point in the flows count 264 in data collection intervals dtk 260, dtk−1 262 or dtk+1 263 be accompanied by a change point in the new IP addresses arrival rate 261. The reasoning for such dependency is that a legitimate use of network resources results in longer interactions with network resources, thus creating less flows than in case of a DDoS attack during which a great number of flows is created.

Figure 18:
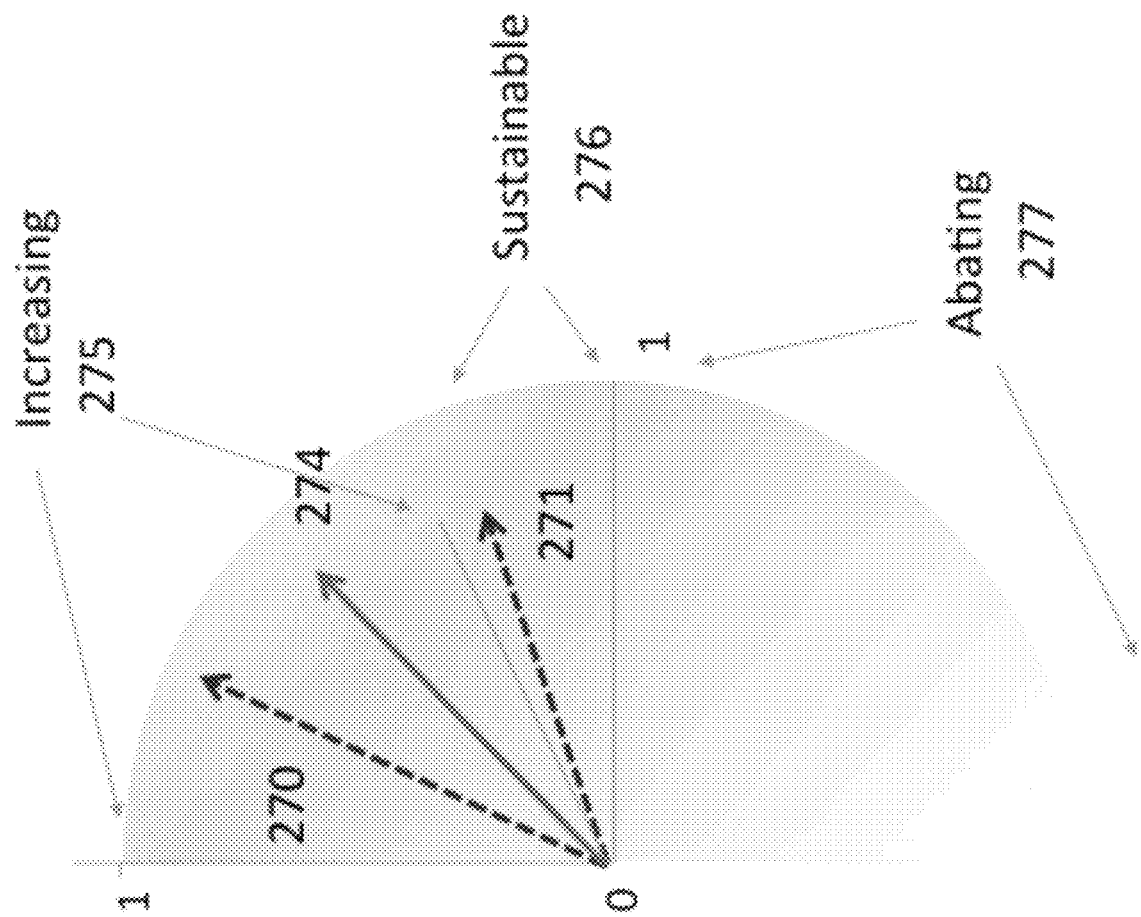
FIG. 18 illustrates an embodiment of the invention in which steps are taken to assess the nature of a network traffic anomaly detected according to the embodiment of FIG. 17.

Referring to FIG. 18, in order to assess the nature of the network traffic anomaly, the most recent observed change point is selected and the trend may be computed for each of the network traffic characteristics (8) 270 and (9) 271, then each computed trend line may be treated as a unit vector and the overall trend 274 may be computed as a vector sum of network traffic characteristics trends 270 and 271.

Further referring to FIG. 18, in order to evaluate the overall trend 274 of the network traffic characteristics, the overall trend 274 may be classified into a plurality of qualitative characteristics such as, without a limitation, Increasing 275, Sustainable 276 and Abating 277. If the overall trend 274 is classified into the Increasing 275 qualitative category, then Agent C preferably reports a network traffic anomaly event along with values of the current network traffic characteristics (8) and (9) and the overall trend slope value.

It should be appreciated that the overall trend classification may differ from the classification in the exemplary embodiment such that the Sustainable 276 category is optional or the classification framework may contain a greater number of qualitative categories.

Agent D: Traffic Entropy Analyzer

Entropy is a measure of unpredictability of information content. It may also be interpreted as a measure of chaos in a system. The entropy, H, is computed as:

$$H = -\sum_{i=1}^{N} p_i \log_1 p_i$$

where $$p_i = \frac{n_i}{N}$$

$n_i$—count of a given source IP address instance, N—total number of observations (N>0).

Since a DDoS attack is typically accomplished by means of subverted network hosts or by spoofing the source IP address in the network packets used to stage the attack, the onset of a DDoS attack is often characterized by an increase in the number of observed IP addresses and, in case of source IP addresses spoofing, a small number of each source IP address observations. Due to the above considerations, an entropy analyzer provides a robust estimate of the network's information consistency.

In an exemplary embodiment, Agent D may compute entropy for each data collection interval dt. Since entropy is a random variable, its mean μ and deviation σ2 should be computed. In order to detect changes in the observed network entropy a sliding observation interval T is preferably selected:

$$T = dt \times N$$

where N is a whole number and the CUSUM algorithm is applied for identifying change points in the computed entropy value on each data collection interval dt. Entropy mean and deviation σ may be computed at the first detected change point but preferably not earlier than N shifts of the observation interval T have taken place and first change point computation is done after 2N×dt data collection intervals.

Figure 19:
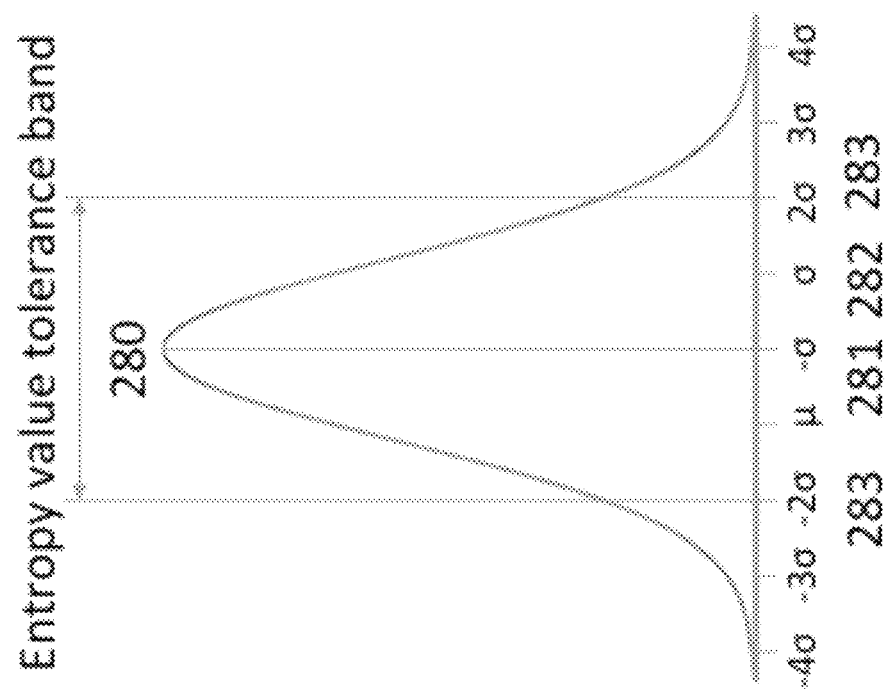
FIG. 19 illustrates an embodiment of the invention in which steps are taken to track entropy deviations.

Referring to FIG. 19, in order to track entropy deviations, region μ±ασ is designated as normal wherein μ 281 denotes mean and σ 282 denotes deviation. Coefficient α defines a tolerance band 280 in which network traffic content is considered adequate. For example, selecting α=2 283 puts normal network traffic content into the 95 percentile and classifies all other network traffic content as anomalous.

Figure 20:
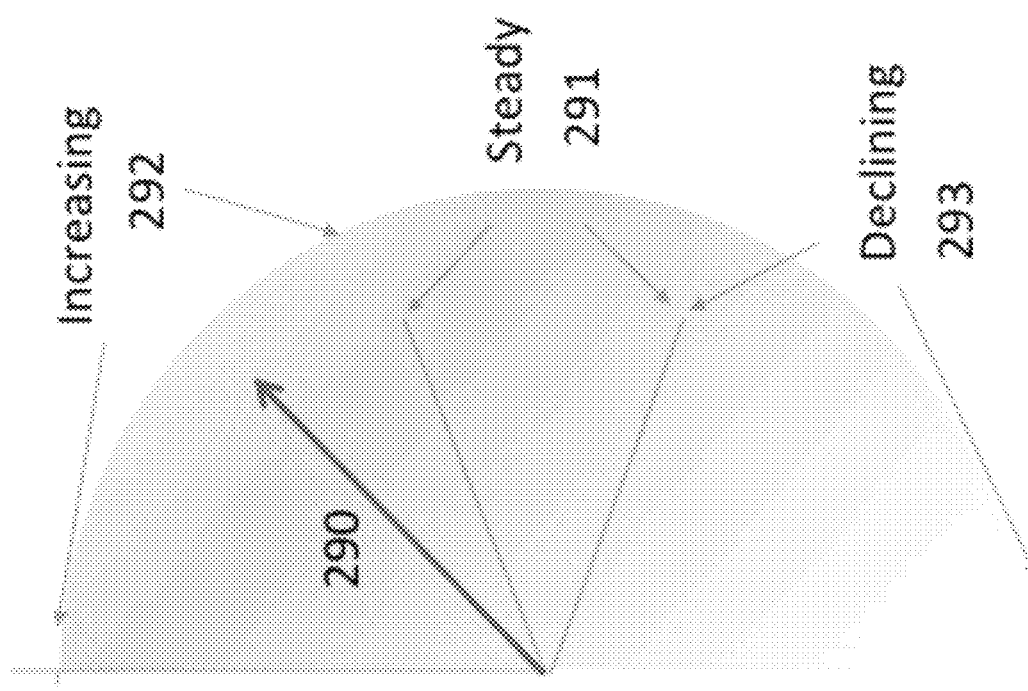
FIG. 20 illustrates an embodiment of the invention in which, when one or more change points are detected on an observation interval, an Agent takes the latest detected change point and computes entropy value trend, starting at the data collection interval when the change point was detected to the current data collection interval.

Referring to FIG. 20, when one or more change points are detected on an observation interval, Agent D takes the latest detected change point and computes entropy value trend 290 starting at the data collection interval when the change point was detected to the current data collection interval. Based on the slope of the trend line, the computed entropy value trend may be classified into the Steady 291, Increasing 292 and Declining 293 qualitative categories. If the entropy value computed for the current data collection interval is outside of the tolerance band and the trend is classified either as Increasing 292 or Declining 293, then Agent D preferably reports a network traffic anomaly and a respective trend classification.

Agent D preferably repeats information about network anomaly and trend classification for each subsequent data collection interval until the entropy value reenters the tolerance band. Upon the entropy value reentering the tolerance band, Agent D preferably reports entropy value abatement.

Network Traffic Anomaly Events Correlation Processor

Referring to FIG. 11, one of the fundamental advantages of the disclosed method is its capability of studying a plurality of aspects of the network traffic description 212 simultaneously. The study is accomplished by a plurality of specialized expert modules called Agents 210. Each Agent analyzes a plurality of the network traffic parameters and makes a conclusion if the network traffic is anomalous in the Agent's universe of discourse. If the Agent finds an anomaly, it reports its findings to the Event Correlation Processor (ECP) 211.

In an exemplary embodiment, ECP 211 collates anomaly reports received from the Agents by an id of a network device which was a source of the flow information for the analysis. Upon receiving an anomaly report, ECP preferably computes a cumulative anomaly confidence metric which takes into consideration the latest report and previous events reported by that flow information source.

Figure 21:
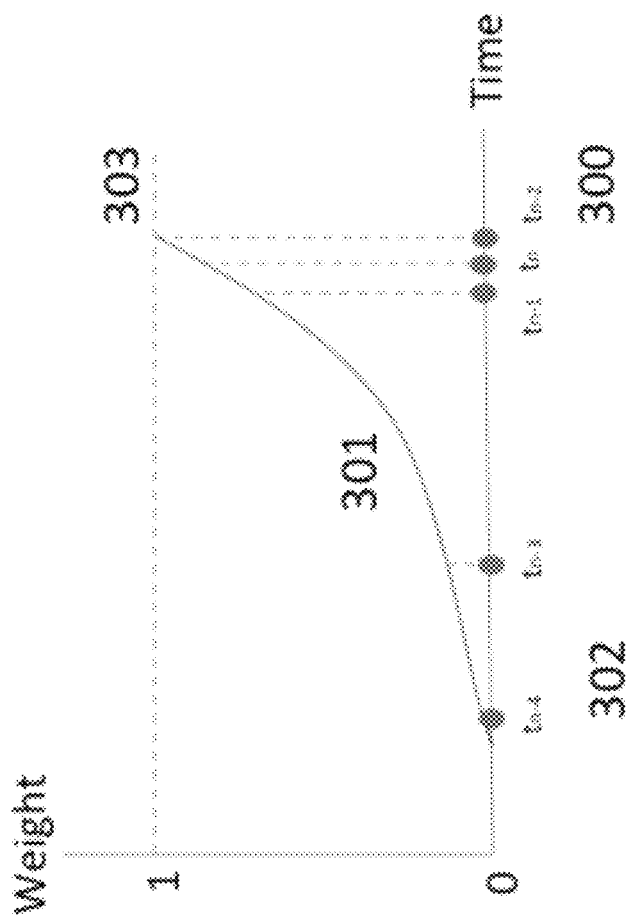
FIG. 21 illustrates an embodiment of the invention that computes a cumulative anomaly confidence metric which takes into consideration the latest report and previous events reported by that flow information source.

Referring to FIG. 21, each reported event may be assigned a weight, w. Last reported event En observed by ECP at time to 300 may be assigned a weight w(tn)=1 303, where n is a sequence number of the reported event. For all previous reported events, the weight is preferably exponentially decayed 301:

$$W(t_{n-k}) = e^{-\mu(t_n - t_{n-k})}, \ 0 < k < n$$

where μ is an exponential decay constant.

The cumulative confidence metric is computed as a sum of weights of all observed events:

$$C = \sum_{i=1}^{n} w(t_i)$$

For practical purposes, in an exemplary embodiment the cumulative confidence metric computation terminates when the weight of a previously reported event becomes less than 0.01 302. ECP 211 preferably alerts the network operator when the cumulative confidence metric value, C, for a particular flow information source exceeds a certain configurable threshold, $\overline{C}$.

It should be appreciated that each reported event may be assigned a weight, ω, based on the reported event type. In an exemplary ECP embodiment the cumulative confidence metric, C, may be computed as:

$$C = \sum_{i=1}^{n} \omega w(t_i),$$

where
ω—is a weight associated with a particular type of event which took place at the time ti.

It also should be appreciated that an exemplary ECP disclosed herein is capable of correlating network traffic anomalies across multiple network devices and issue alerts for a plurality of network devices which experience anomalous network traffic. In an exemplary embodiment of such correlation ECP may issue alerts for network devices in a certain geographical region based on an IP blocks allocation database or grouped by one or a plurality of the Autonomous System Numbers (ASN).

Converging Network Traffic Anomalies Detection and Network Devices Health

It should be appreciated that network traffic anomalies such as flooding DDoS attacks contribute to a lower network Node Health Score (NHS) of a network device. Referring to FIG. 4 it should be noted that increased network traffic level 130 and packet rate 131 map to a high ("H") attention level for a particular network node and thus decrease its NHS value which in turn decreases the overall network device's NHS value. In an exemplary embodiment emergence of one or a plurality of the network devices with low NHS values may be considered as yet another event included in a collection of events processed by the Event Correlation Processor (ECP).

It should also be appreciated that the input of the network devices health information in the collection of events processed by the Event Correlation Processor (ECP) may be manipulated by assigning a weight to the network devices health information thus controlling influence of the network devices health information on the anomalous network traffic identification.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method for detecting and classifying network traffic anomalies, comprising:
   receiving a packet of information related to network traffic;
   passing said packet to a plurality of network traffic analyzers, each network traffic analyzer capable of applying a corresponding one of a plurality of analytical algorithms to information contained in the packet;
   receiving results of analysis performed by the plurality of analyzers, each result corresponding to an event type;
   evaluating results of analysis performed by the plurality of analyzers as a collection by applying an exponentially decayed weight to each of the results, dependent upon event type, and calculating a cumulative confidence metric as a sum of the weights;
   determining if the result of evaluation signifies a network traffic anomaly by comparing the cumulative confidence metric to a threshold; and
   emitting an alert if the result of evaluation signifies a network traffic anomaly.

2. A method as set forth in claim 1, further comprising the step of performing trend analysis upon the results of said evaluating step to reduce false positives.

3. A method for detecting and classifying network traffic anomalies, comprising:
   configuring a data observation interval (dt);
   setting a traffic observation interval (T) as T=2n*dt, where n is a positive whole number;
   receiving a stream of packets of information related to network traffic over the traffic observation interval as a series of observations, wherein each observation in the series of observations is the data observation interval length;
   passing at least a portion of said stream of information packets to a network traffic analyzer;
   applying a wavelet series algorithm to a characteristic of the observations to perform a change detection, wherein at least one change points are detected;
   determining if said applying step indicates the existence of a network traffic anomaly by calculating a trend for the characteristic after the change point, and determining the anomaly exists when the trend is increasing; and
   emitting an alert if a network traffic anomaly is detected;
   wherein said applying and said determining step are practiced prior to any step of permanently storing said portion of said stream of information packets.

4. A method for assessing the condition of an interface of a network device, comprising:
   receiving a stream of packets of information related to network traffic passing through said network device interface;
   passing at least a portion of said stream of information packets to a network traffic analyzer;
   applying at least one analytical algorithm to said portion of said stream of information packets, wherein the at least one analytical algorithm includes a change detection function to detect a change point, and analyzing a characteristic after the change point as
   a metric for assessing an operational condition of said network device interface;
   applying an exponentially decayed weight to the metric and calculating a cumulative confidence metric as a sum of the metric weight along with weights of other metrics;
   emitting an alert if said cumulative confidence metric indicates an abnormal operational condition of said network device interface;
   wherein said applying and said metric computation are practiced prior to any step of permanently storing said portion of said stream of information packets.

5. A method as set forth in claim 4, further comprising the step of performing trend analysis upon the results of said metric computation to predict a risk of failure of said network device interface.

6. A method as set forth in claim 4, further comprising the step of assessing the operational condition of the said network device as a function of assessed operational condition of the interface of said network device;
   wherein said assessing step is practiced prior to any step of permanently storing said portion of said stream of information packets.

7. A method as set forth in claim 6, further comprising the step of assessing the operational condition of a second network service, comprising:
   receiving a second stream of packets of information related to network traffic passing through more than one network devices that forward said network traffic to and from said second network service;
   passing at least a portion of said second stream of information packets to a second network traffic analyzer;
   applying said method to information packets pertaining to at least a portion of said network devices that forward said network traffic to and from said second network service;
   determining if said applying step indicates an abnormal operational condition of at least one of said network devices;
   emitting a second alert pertaining to the second network service if said applying step indicates an abnormal operational condition of at least one said network device that forwards said second network traffic to and from said second network service;
   wherein said determining and said emitting steps are practiced prior to any step of permanently storing said portion of said second stream of information packets.

* * * * *